US006963575B1

(12) United States Patent
Sistanizadeh et al.

(10) Patent No.: US 6,963,575 B1
(45) Date of Patent: Nov. 8, 2005

(54) ENHANCED DATA SWITCHING/ROUTING FOR MULTI-REGIONAL IP OVER FIBER NETWORK

(75) Inventors: Kamran Sistanizadeh, San Francisco, CA (US); Alex Tashayod, San Ramon, CA (US); Lynn Eric Bashaw, Aurora, CO (US); Masoud M. Kamali, San Francisco, CA (US); Craig Robert Collar, San Carlos, CA (US)

(73) Assignee: Yipes Enterprise Services, Inc., San Francisco, CA (US)

( * ) Notice: Subject to any disclaimer, the term of this patent is extended or adjusted under 35 U.S.C. 154(b) by 944 days.

(21) Appl. No.: 09/793,703

(22) Filed: Feb. 27, 2001

Related U.S. Application Data

(60) Provisional application No. 60/209,795, filed on Jun. 7, 2000.

(51) Int. Cl.[7] ............................................. H04L 12/28
(52) U.S. Cl. ........................ 370/404; 370/401; 370/408
(58) Field of Search ................................ 370/216, 217, 370/218, 219, 222, 224, 225, 254–258, 352, 370/390, 400–408; 709/249; 379/112.04

(56) References Cited

U.S. PATENT DOCUMENTS

| | | | |
|---|---|---|---|
| 5,375,070 A | | 12/1994 | Hershey et al. |
| 5,490,252 A | * | 2/1996 | Macera et al. ............... 709/249 |
| 5,544,163 A | * | 8/1996 | Madonna .................... 370/352 |
| 5,650,994 A | | 7/1997 | Daley |
| 5,740,355 A | | 4/1998 | Watanabe et al. |
| 5,802,041 A | | 9/1998 | Waclawsky et al. |
| 5,923,654 A | * | 7/1999 | Schnell ........................ 370/390 |
| 5,946,302 A | | 8/1999 | Waclawsky et al. |
| 5,974,457 A | | 10/1999 | Waclawsky et al. |
| 6,003,079 A | | 12/1999 | Friedrich et al. |
| 6,018,625 A | | 1/2000 | Hayball et al. |
| 6,041,352 A | | 3/2000 | Burdick et al. |
| 6,061,335 A | | 5/2000 | De Vito et al. |
| 6,101,188 A | * | 8/2000 | Sekine et al. ................ 370/401 |
| 6,108,782 A | | 8/2000 | Fletcher et al. |
| 6,137,782 A | | 10/2000 | Sharon et al. |
| 6,243,746 B1 | | 6/2001 | Sondur et al. |
| 6,278,694 B1 | | 8/2001 | Wolf et al. |

(Continued)

OTHER PUBLICATIONS

Suite-Wide Product Options [online]. Concord Communications, 2001 [retrieved on Jan. 15, 2001]. Retrieved from the Internet:<URL:http//www.concord.com/products/ehealth/options/options.htm>.

(Continued)

*Primary Examiner*—Alpus H. Hsu
*Assistant Examiner*—Lee Khuong
(74) *Attorney, Agent, or Firm*—McDermott Will & Emery LLP

(57) ABSTRACT

Wide-area data communications utilize regional networks transporting IP-over-Ethernet on fiber. For certain Layer 2 services, a regional implementation of the network makes limited use of spanning tree protocol on a backbone ring. Learning bridge operations in switches on associated access rings involve a short default for an aging timer. For use of Open Shortest Path First (OSPF), the connection of each access ring to the backbone ring uses a pair of routers with dual links therebetween. One of these links is bonded to the backbone (OSPF Area 0), whereas the other link is bonded to the Area of the respective access ring. Also, certain routers within each regional network form a mini-autonomous system, for boundary gateway protocol (BGP). The mini-autonomous systems of the regional networks form a confederation. The network utilizes route reflectors in the mini-autonomous systems. The Internet carries confederation commands to and from a designated hub.

15 Claims, 6 Drawing Sheets

U.S. PATENT DOCUMENTS

| | | | |
|---|---|---|---|
| 6,282,172 B1 | 8/2001 | Robles et al. | |
| 6,304,639 B1 * | 10/2001 | Malomsoky et al. | 379/112.04 |
| 6,359,882 B1 | 3/2002 | Robles et al. | |
| 6,466,974 B1 | 10/2002 | Nelson et al. | |
| 6,502,131 B1 | 12/2002 | Vaid et al. | |
| 6,515,969 B1 * | 2/2003 | Smith | 370/256 |
| 6,529,499 B1 | 3/2003 | Doshi et al. | |
| 6,603,757 B1 * | 8/2003 | Locascio | 370/352 |
| 6,615,259 B1 | 9/2003 | Nguyen et al. | |
| 6,647,413 B1 | 11/2003 | Warland et al. | |
| 6,678,241 B1 * | 1/2004 | Gai et al. | 370/216 |
| 6,681,232 B1 | 1/2004 | Sistanizadeh et al. | |
| 6,711,125 B1 | 3/2004 | Walrand et al. | |
| 6,714,517 B1 | 3/2004 | Fawaz et al. | |
| 6,714,976 B1 | 3/2004 | Wilson et al. | |
| 6,779,027 B1 | 8/2004 | Schunicht et al. | |
| 6,826,158 B2 * | 11/2004 | Seaman et al. | 370/254 |
| 6,850,483 B1 * | 2/2005 | Semaan | 370/218 |

OTHER PUBLICATIONS

Live Health [online]. Concord Communications, 2001 [retrieved on Jan. 15, 2001]. Retrieved from the Internet: <URL:http//www.concord.com/products/ehealth/livehealth/livehealth.htm>.

eHealth Suite [online]. Concord Communications, 2001 [retrieved on Jan. 15, 2001]. Retrieved from the Internet: <URL:http://www.concord.com/products/ehealth/ehealth.htm>.

JYRA Solutions [online]. Jyra Research Ltd., 1997-2000 [retrieved on Jan. 15, 2001]. Retrieved from the Internet: <URL:http://www.jyra.com/solutions/performance.htm>.

SMA Server Product Overview. Jyra Research Ltd., 2000.

Universal Data Collection for Your Internet Business Infrastructure. Narus Virtual Analyzers. NARUS, Inc., 2001.

Hardware Solutions for Semantic Traffic Analysis. Narus Analyzers. NARUS, Inc.

Schneider et al. "Management of virtual private networks for integrated broadband communication", ACM 1993, pp. 224-237.

Puka et al., "Service level management in ATM networks", Proceedings, International conference on information technology: coding and computing, Mar. 2000, pp. 324-329.

Fuller, "Network management using expert diagnostics", International journal of network management, 1999, pp. 199-208.

"SONET", Newton's TeleCom Dictionary, Harry Newton, Feb. 2002, pp. 684-685.

"SONET Interface Layers", Newtown's TeleCom Dictionary, Harry Newton, Feb. 2002, pp. 685-686.

BGP4 Case Studies Section 1 printed from http://www.cisco.com/warp/public/459/13.html on Nov. 24, 2000. p. 1-14.

Kamran Sistanizadeh, "Managed IP Optical Internetworking: A Regional IP-over-Fiber Network Service Architecture", Yipes Communications, Inc. 2000, p. 1-20.

OSPF Design Guide, printed from http://www.cisco.com/warp/public/104/2.html on Nov. 24, 2000, p. 1018.

"Extreme Networks Products at a Glance".

BlackDiamond® 6808, printed from http://www.extremenetworks.com/products/datasheets on Nov. 24, 2000, p. 1-4.

Summit24™ and Summit48™ Data Sheet, printed from http://www.extremenetworks.com/products/datasheets on Nov. 24, 2000, p. 1-4.

BGP4 Case Studies Section 4, printed from http://www.cisco.com/warp/public/459/16.html on Dec. 18, 2000, p. 1-16.

Rfc1965, printed from http://www.cis.ohio-state.edu/htbin/rfc/rfc1965.html on Dec. 18, 2000, p. 1-6.

* cited by examiner

ENHANCED DATA SWITCHING/ROUTING FOR MULTI-REGIONAL IP OVER FIBER NETWORK

RELATED APPLICATION

This application claims the benefit of U.S. Provisional Application No. 60/209,795, entitled "REGIONAL IP OVER FIBER NETWORK SERVICE ARCHITECTURE" filed on Jun. 7, 2000, the disclosure of which is entirely incorporated herein by reference.

FIELD OF THE INVENTION

The concepts involved in the present invention relate to a new approach to high-capacity metropolitan area networking. In particular, the present invention relates to a network architecture and related communication techniques involving extending local area network technology to provide direct switching/routing and transport via fiber optic rings, over wider transport areas.

BACKGROUND

The explosive growth of e-commerce, Internet-based businesses, and multimedia streaming is creating an insatiable demand for network bandwidth. At the same time, new network-enabling technologies are fueling the desire for bandwidth by opening up new possibilities for its use. This in turn has accelerated the emergence of more data-intensive applications, which are further fueling the demand for bandwidth. This cycle is driving a spiraling demand for bandwidth and the technology to support and deploy this bandwidth.

Until recently it was a given that data sometimes did not get through or packet delivery might be sporadic or only at a best-effort rate. However, with the accelerating rise in the level of complexity and sophistication in e-commerce, real-time transaction processing, and media streaming, this is no longer acceptable. Service levels must now be defined and adhered to. While "Quality of Service" (QoS) is a concept with a nominal standards-body derived definition, the requirements for Extranet/Intranet networking services are driving QoS towards metrics which are clearly measurable, verifiable, and reportable.

Furthermore, meeting these QoS metrics is becoming a stringent requirement for service providers to meet their contractual obligations. Thus, Quality of Service and the measurement and assurance of QoS have taken a significant role in defining future network architecture requirements. This has in turn created new traffic engineering challenges for network service providers. There is now a need to be able to guarantee a minimum bandwidth across shared network infrastructures. Customers require these guarantees to ensure the proper performance of latency and/or jitter sensitive applications such as Voice-over-IP (VoIP) and for bandwidth-intensive applications such as streaming multimedia. Designing an architecture that can meet this requirement is an engineering challenge. Integrating this architecture with the unpredictability and underestimated capacity of the public Internet becomes even more of a challenge.

Business customer requirements for network services are becoming increasingly sophisticated and stringent. The salient features such as network reliability, physical and logical security, resource availability, network configuration flexibility, service profile manageability, and application based QoS networked elements are prerequisites for real-time business applications. To meet such requirements, the underlying network platform should have multifaceted features and functionality. The capacity of the transport network should be not only large enough to accommodate future growth, but also flexible and scalable so as to be apportioned on a dynamic, on-demand basis. Additionally, the platform should support protocol Layer 3 routing as well as protocol Layer 2 switching in order to accommodate different customer network architectures and protocols.

SUMMARY OF THE INVENTION

The invention meets the needs for improved high-capacity networking, for example, by providing managed transport for all communication services using IP over fiber-transported Ethernet. Principles of local area network (LAN) routing are extended to the metro-area environment. Service is targeted at high-speed data applications, such as video streaming and broadcasting. The high-speed data network support services from text and voice over IP to broadband applications rich in multimedia content. The network allows customers to obtain necessary bandwidth and other quality of service features, on demand.

Several aspects of the invention preferably are implemented in a regional-area network, for data communications. The regional-area network includes a number of access ring networks. Each access ring network comprises edge-point of presence (E-POP) switches and data links from the E-POP switches to individual customer locations. The regional-area network includes at least one and preferably two mega-point of presence (M-POP) switches. A redundant optical fiber access ring interconnects the E-POP switches and connects to the one or more M-POP switches. The regional network also includes a redundant optical fiber backbone ring interconnecting the M-POP switches of the various access ring networks in the particular region. At least one giga-point of presence (G-POP) switch, coupled to the redundant optical fiber backbone ring, provides data communication to and from a wide area data network such as the Internet.

Aspects of the invention also relate to operation of a number of regional networks, preferably of the type described above, so as to form a distributed network. The distributed network may provide data communication services on a nationwide basis or over an even larger geographic area. In the presently preferred embodiments, the regional networks communicate with each other and with independent autonomous systems via the public Internet.

In this case, the data communications encompass any form of communications capable of transport in digital form. The inventive data communication networks can provide transport for text, image, multimedia, audio, video, voice-telephony, and other types of communications.

A first specific aspect of the invention involves a learning bridge module, running in each of the E-POP switches of the access ring networks, in a regional network. Such a module enables the switch to learn media access control addresses and port information corresponding to the media access control addresses, for switching control purposes, from frames communicated via the respective access ring network. A spanning tree protocol (STP) agent runs in M-POP switch(es) of the respective access ring network. This agent manages routing tables for the media access control addresses. The E-POP switches, however, do not run spanning tree protocol. An aging timer, with a default value, is included in each of the learning bridge modules. This timer causes the particular E-POP switch to discard learned port information corresponding to an individual media access control address, if no further frame containing the individual media access control address is received before the aging timer reaches the default value. In accord with the invention, the default value is set to a relatively short time, for example 30 seconds or less.

Another aspect of the invention relates to certain implementations of the network to facilitate use of Open Shortest Path First (OSPF) protocol in a data communication network providing routing services. The network includes a plurality of access rings. Each access ring includes edge routers, interconnected by data network spans to form the respective access ring, and links connected from the edge routers to customer equipment locations. Each of the edge routers runs OSPF protocol and is configured such that the access rings form OSPF Areas 1 to N. The network also includes pairs of backbone routers. Each pair of backbone routers is coupled to one of the access rings forming OSPF Areas 1 to N. Data network spans interconnect the pairs of backbone routers to form a backbone ring. The backbone routers also run the OSPF protocol. The backbone routers are configured such that the backbone ring forms OSPF Area 0. A pair of data communication links connect between routers of each respective pair of backbone routers. A first one of these data links is bonded to OSPF Area 0, and the second one of these data links is bonded to a respective one of Areas 1 to N.

Another inventive aspect relates to a method of route advertisement for a single wide area autonomous data network domain. The method involves dividing the single network domain into mini-autonomous systems, each of which comprises a number of routers. Within each mini-autonomous system, one of the routers having logical connectivity to all other routers in the mini-autonomous system is designated as a route reflector. The other routers within each mini-autonomous system advertise to the route reflector, and the route reflector advertises routes to all of the other routers. The method also entails designating a router in at least one of the mini-autonomous systems as a hub, for the single wide area autonomous data network domain. All the routes of each mini-autonomous system are advertised to the hub via the public Internet; and the hub advertises routes of each of the mini-autonomous systems to the other mini-autonomous systems, via the public Internet.

In the preferred embodiment of this route advertisement method, the advertising of routes to and from the route reflector within each mini-autonomous system utilizes internal boundary gateway protocol (iBGP). In contrast, the advertising of routes from each mini-autonomous systems to the hub and from the hub to the other mini-autonomous systems utilizes confederation commands for the boundary gateway protocol (BGP).

Another aspect of the inventive use of BGP relates to a method of operating a boundary router. This method involves that router reflecting internal BGP routing information to and from routers within a first mini-autonomous system containing the boundary router. The first mini-autonomous system is one of a number of mini-autonomous systems, which together form a confederation. The boundary router exchanges external BGP information with at least one router of an independent autonomous system via the Internet. The boundary router also exchanges confederation BGP information with a remote hub router in a remote second one of the mini-autonomous systems of the confederation, via the Internet.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PRESENTLY PREFERRED EMBODIMENTS

Figure 1:
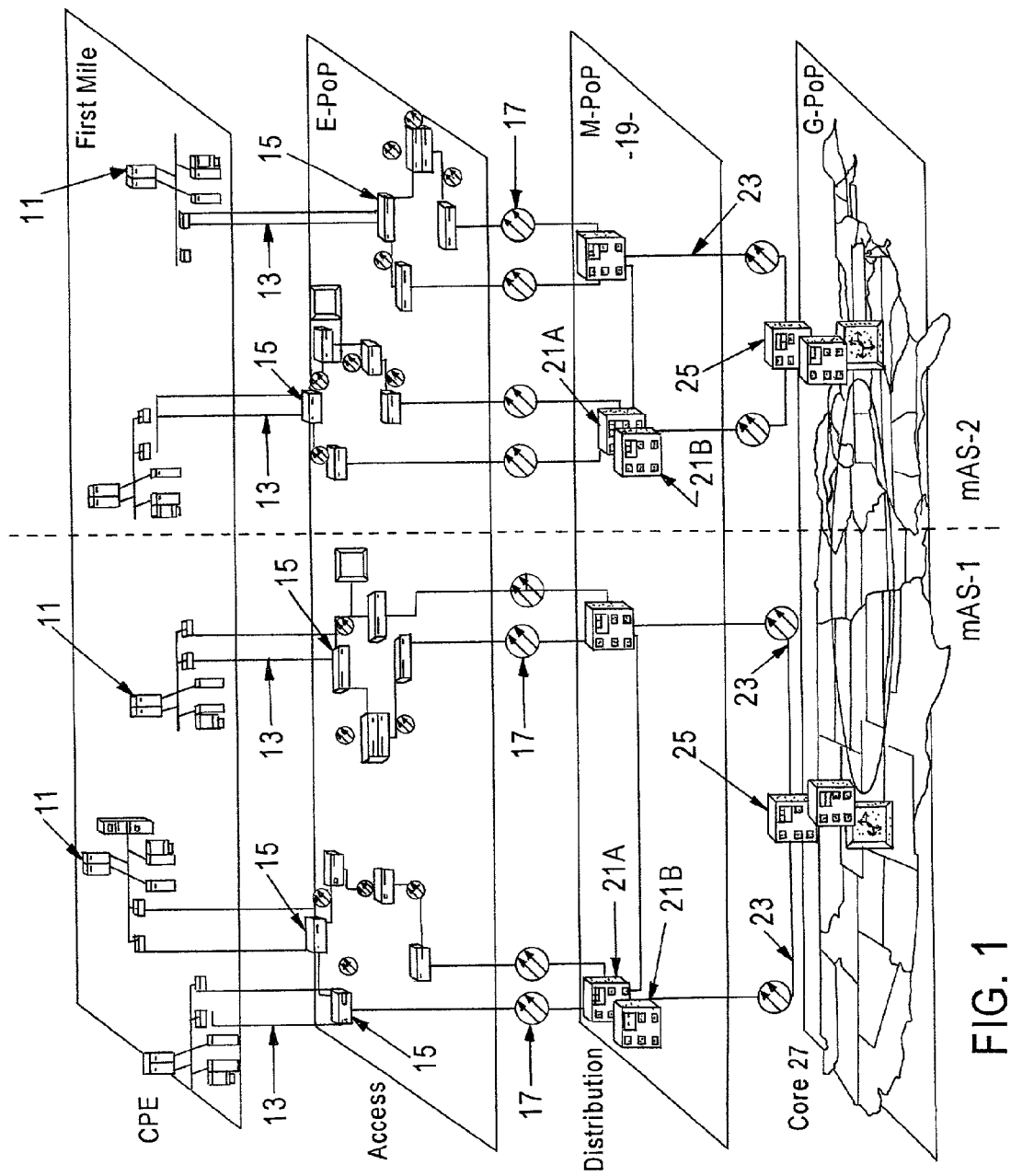
FIG. 1 is a schematic diagram of the overall topology of a network in accord with the present invention.

Reference now is made in detail to the presently preferred embodiments of the invention, examples of which are illustrated in the accompanying drawings and discussed below, wherein like reference numerals indicate like elements throughout the several views.

The presently preferred embodiments use redundant optical fiber access rings, each interconnecting a plurality of edge data switches and at least one core data switch, for high capacity and high reliability transport of data communication services. The term "ring" means that if you consider one node as a start, the data communications starting out from one socket can go around the network and come back to the other socket into the same node. The term "redundant ring" means that the ring can carry traffic in both directions around the ring from each node on the ring, that is to say via two adjacent nodes. If a link to a node fails, the redundant capacity allows the node to continue to communicate via the opposite link around the ring that is to say via an alternate one of the adjacent nodes. The term "data" communications encompasses any form of communications capable of transport in digital form. For example, the inventive data communication networks can provide transport for text, image, multimedia, audio, video, voice-telephony, and other types of communications.

In the inventive network, a redundant optical fiber access ring interconnects the core data switches of the access ring, to form a backbone distribution ring. Data links connect the edge data switches to end-user data systems. The data links provide two-way transport using Layer 1 (physical) and Layer 2 (framing/switching) protocol elements of a local area networking protocol, preferably Ethernet. In the inventive network, the access rings and the backbone distribution ring utilize the layer 1 and layer 2 protocol elements of the local area networking protocol to directly provide two-way data communications transport over the rings, that is to say without the use of other lower level protocol elements on the fiber links. In the Ethernet embodiment, the rings provide direct transport of Giga-bit Ethernet protocol signals. Certain inventive aspects, discussed below, relate to manipulations of switching and routing protocols utilized in the network, to optimize services and operations thereof.

General Description of Network

FIG. 1 provides a high-level functional illustration of the inventive network. The drawing shows the network topology organized into a series of logical "planes." The top plane provides first mile connectivity for end user equipment 11. Typically, a customer's data equipment 11 connects through an RJ45 jack and CAT-5 cable 13 to a first level data switch, forming an edge point of presence (E-POP) 15 in the access plane. The E-POP 15, for example, often is located in the basement of a multi-story building complex or at a designated common site within a building complex or campus environment. The E-POP switch 15 preferably is a giga-bit Ethernet switch. The term "data switch" is used herein to refer to any device capable of providing protocol layer 2 data switching and preferably providing protocol layer 3 data routing. The term "router" refers to a device providing at least layer 3 routing service.

A given metro-area or region will have optical fibers 17 forming one or more rings. Up to 10 E-POP switches 15 are concatenated together with a mega point of presence (M-POP) via such an optical fiber access ring. The M-POPs 19 preferably comprise two linked data switches 21A, 21B, which are elements of both the access network and the regional backbone network. The M-POPs 19 in turn connect via optical fiber 23 to a giga-POP (G-POP) hub switch center 25 of a regional backbone network and/or a national backbone network referred to as the Core 27. A number of M-POPs 19 and a G-POP 25 in each region preferably are connected together by the optical fibers 23 to form a backbone ring. The optical fiber rings and POPs from the edge through a backbone network to the G-POP form a regional network. The carrier's overall network includes a plurality of such regional networks.

The use of the rings in the access layer and the distribution layer provides redundancy and thereby helps to increase the over-all reliability of the network. Each ring provides two-way communication. Any switch on the ring therefore has two paths over which to communicate, one in each direction around the ring. If one side of the ring fails, the switch will typically still be able to communicate in the opposite direction around the ring. In the preferred embodiments, these rings also use parallel fibers in each span, for increased capacity and further redundancy.

The optical fiber transport of the Ethernet signals extends from the customer premises equipment 11 all the way through the backbone network to the boundary with the Core 27. The various POPs provide switching at protocol Layer 2 as well as routing at protocol Layer 3. Unlike earlier fiber networks, the inventive network directly transports the Ethernet framing signals via the optical fibers. Lower level protocol signals formerly used at or near the physical layer (L1) and the data link layer (L2), such as SONET and ATM, are eliminated from the subscriber drops, the local access rings and the rings extending to the backbone. Only if there is an interface to a network, which does not support Giga-bit Ethernet, will there be a need for a protocol conversion to SONET or the like.

Individual customers may subscribe to a wide range of types and rates of services. For example, the data rate at the RJ45 jack may appear as a 1 Mbps service, as a 10 Mbps service or as a 100 Mbps service. Within a given service, the customer is guaranteed at least the specified data rate and at times may obtain burst rate services much higher than the nominal subscription service rate. The network elements essentially throttle the service of a particular customer at the customer port, based on a service profile for that customer. To maximize the service flexibility to the customer, the network also offers the customers on-line access to their service profiles, for example, via a web-based interface.

In practice, the actual bandwidth achieved may be less than the maximum depending upon a number of factors. This is because a network connection can only run as fast as it's weakest link. In the case of Internet service, the weak link often may be an overloaded web server or a lower bandwidth connection (such as a T1) into a remote web site. It may also be the customer's own firewall or proxy server, since most of these devices were never designed to operate at Ethernet wire speed. Care must be taken to understand that simply having an exceptionally high bandwidth connection can uncover new network bottlenecks, which had not previously been considered.

The services supported through the network include Internet connectivity, point-to-point or multipoint-to-multipoint connectivity, or even voice service using Voice-over-IP. The network also supports an expanded form of local area network extension service referred to as a metro-area network or 'MAN' service. Now each MAN is defined only by a logical architecture, not physical or geographical limitations. As such, customer devices of a particular virtual LAN or MAN may reside anywhere that the customer has obtained access to the metro-area network through an E-POP 15.

The network traffic generally can be broken down into four classes of service, Internet traffic, MAN traffic, time critical traffic such as Voice-over-IP, and signaling/network management traffic. The data switches in the network assign different priority levels to these different classes of traffic and prioritize transport thereof accordingly.

Figure 2:
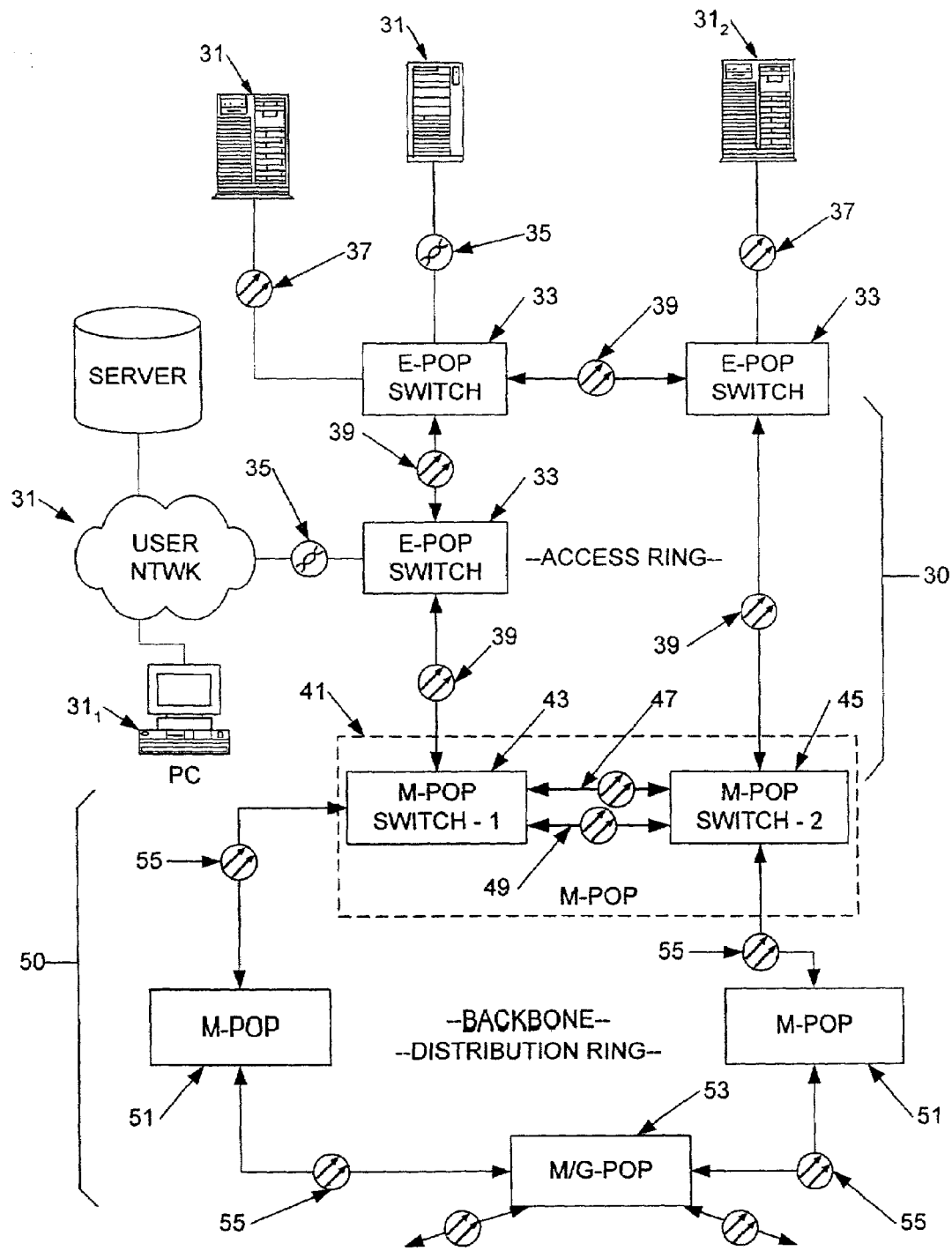
FIG. 2 is a functional block diagram of a portion of the network of FIG. 1, showing more details of one of the access rings and one of the backbone distribution rings, of the inventive network.

FIG. 2 shows a metro-area portion of the network, in somewhat more detail. In the example of FIG. 2, an access ring 30 serves end-user equipment 31 within a number of buildings. Each end user's system 31 connects to an E-POP data switch 33, typically through a CAT-5 twisted wire pair 35, but in some cases through an optical fiber link 37. Each customer's end user equipment 31 may comprise a variety of different mainframe or server type computer systems or some combination of servers and personal computers linked together by a private network of the user. Each E-POP data switch 33 serves a number of user systems within the respective building or campus.

The connections between the E-POP data switch 33 and the end user systems 31 utilize a star topology. The connections 35 and 37 to the end user systems 31 support 10baseT (10 Mb/s) Ethernet or 100baseT (100 Mb/s) Ethernet or Giga-bit (1000 Mb/s) Ethernet. The fiber links 37 may be single mode or multi-mode links. It is preferred that the links 35 are twisted wire pairs, and the links 37 are single or paired optical fibers. In some cases, however, the links to the end user systems 31 may use wireless radio or wireless optical technologies. Coaxial cable or other physical media also may be used.

Since the E-POP switch is just that—a network switch—there are many different ways a customer could conceivably connect to it, with very few restrictions. What is reasonable or necessary depends on each customer's requirements and the scope of their networking needs.

Depending on the Customer's network architecture, the Customer may be using some type of network edge device such as a router, firewall, or proxy server as the point of connection to the E-POP switch 33. In other cases, the Customer may have a switch to further branch out connections to a combination of these devices. In all cases, connections preferably are made using either straight-through or cross-over Category 5 cabling with RJ-45 connectors.

In the presently preferred embodiment, the customer ports of the E-POP switches 33 are normally set to operate at 10/100 Base-T with Auto Negotiation. Depending on customer bandwidth requirements, the switch ports will be set to 10 or 100 Mbps, Half or Full Duplex. For customers given maximum burstable data rates at or below 10 Mbps, the E-POP port speed should be set to 10 Mbps and duplex settings must be specified. For full duplex operation, the hardware on the customer's side of the link must also support full duplex, and there must be no other devices on the Ethernet segment. Port configuration (speed and duplex) settings for the E-POP will be set to match the characteristics of the customer's router, switch, or other device which will connect to the access ring 30.

The maximum rate at which a customer can send data packets into the network ("bursting") is physically limited in one of two ways. The physical limit of the cable may serve as the maximum transmission limit (i.e. 10 or 100 Mbps). Alternatively, this rate is set by QoS policy provisioned within the E-POP switch 33 so that the logic of the E-POP limits the maximum effective bit rate. The network architecture is designed to use QoS policies to set the bandwidth to match the services desired by each customer. Thus, if a customer purchases 25 Mbps of bandwidth, the edge switch 33 in the serving E-POP limits the maximum rate at which data can traverse that customer's port to 25 Mbps in one and preferably both directions, even though the physical link is a 100 Mbps port.

Optical fiber pairs 39 interconnect the E-POP switches 33 and connect to an M-POP 41, to thereby form a redundant, two-way optical fiber ring, that is to say the access ring 30. Each fiber pair 39 in the ring 30 provides 1 Gb/s two-way transport using Giga-bit Ethernet. Each strand in a pair carries traffic in one direction, although bidirectional fiber communication could be used. Each POP on the access ring 30 views the parallel fibers as a single aggregate port. To each POP, the ring is redundant in that the POP can communicate two-way traffic with either of two adjacent POPs on the ring. If the link to one adjacent POP fails, the other link 39 will still allow communication to continue via the other adjacent POP.

To further increase the capacity, it is possible to aggregate capacity of a plurality of parallel rings of pairs of fiber (not separately shown), for example to achieve up to 8 Gb/s transport capacity in each direction around the ring 30. Alternatively, the fiber pairs 39 could utilize wavelength division multiplexing carrying logically separate Gb/s streams on separate wavelengths, to allow traffic aggregation and thereby achieve higher overall rates around the access ring 30. With some additional equipment (not shown), the access ring can currently support up to 60 Gb/s.

The M-POP 41 comprises a first data switch 43 and a second data switch 45. The switches 43 and 45 are interconnected by two high-speed data links 47 and 49. The first of these links 47 logically completes the loop of the access ring 30. The other link 49, however, forms an element of the distribution or backbone ring 50, albeit within the M-POP 41. The switches 43,45 of the M-POP may be considered as elements of the access ring 30 and/or as elements of the backbone ring 50. Although only one access ring 30 is shown, each M-POP 41 may connect to a plurality of subtending access rings 30.

In an initial implementation, the E-POP switches 33 are Summit data switches from Extreme Networks. For example, the Summit48 provides a 17.5 Gbps non-blocking switch fabric and has a forwarding rate of 10.1 million packets per second (pps). The Summit48 comes with wire-speed Layer 2 switching and wire-speed basic Layer 3 routing using static routing or RIP V1/V2 routing protocols, however, with an available upgrade, the switch provides full Layer 3 switching, including support for protocols such as OSPF, DVMRP, PIM and IPX routing of multiple encapsulation types. This switch offers 48 10/100 Mb/s Ethernet ports as well as two full-duplex Gigabit Ethernet ports. The Summit48 also supports policy based priority queuing, for QoS (quality of service) functions.

As noted, the Summit48 supports OSPF (Open Shortest Path First). OSPF is a routing protocol that determines the best path for routing IP traffic over a TCP/IP network. OSPF is an interior gateway protocol (IGP), which is designed to work within an autonomous system, and it serves as a link state protocol. OSPF protocol is used in the inventive network for IP packet routing within each region.

In the initial implementation, each of the data switches 43, 45 in the M-POPs is a 6800 series BlackDiamond from Extreme Networks. This class of data switch supports as many as thirty-two Gigabit Ethernet ports. The BlackDiamond is a shared-memory switch. Each slot has four Gigabit taps into the backplane. A load-balancing algorithm passes traffic between different line cards on the switch. The BlackDiamond supports a variety of routing protocols, including OSPF and 802.1Q-compliant VLANs (virtual LANs) as well as extensive standards-based QoS (quality of service) features. The BlackDiamond platform provides an OSPF ASBR (Autonomous System Boundary Router) functionality redistribution of routes. In preferred embodiments, these switches also run Boundary Gateway Protocol (BGP), for packet routing between regions and for packet routing to and from the Internet.

The Summit switches and the BlackDiamond switches are exemplary platforms offering the desired data capacity and protocol support. Those skilled in the art will recognize, however, that switches from other vendors may be used. Also, the inventive architecture is readily scalable. Alternative data switches may be used to scale the services to higher data rates or to service more customers, as needed.

The backbone distribution ring 50 includes a number of other M-POPs 51, serving different access rings (not shown). The M-POPs 51 are generally similar to the M-POP 41. In this embodiment, the distribution ring 50 also includes an M/G-POP 53.

Figure 3:
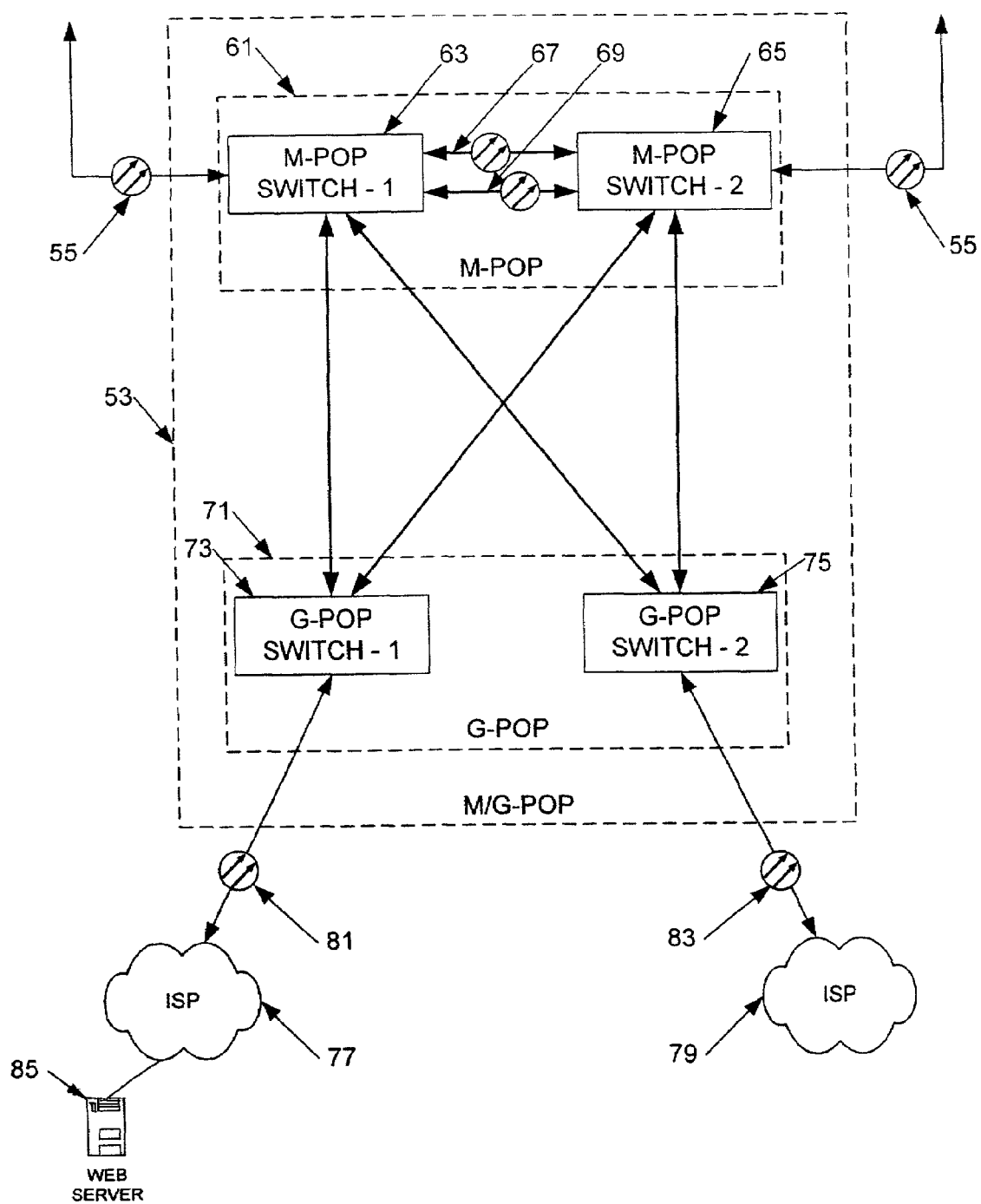
FIG. 3 is a functional block diagram of an M/G-POP, used in the network of FIGS. 1 and 2.

The structure of the M/G-POP 53 essentially combines the elements an M-POP 61 and the elements of a G-POP 71, at one location, as shown in more detail in FIG. 3. The M-POP portion 61 of the M/G-POP 53 comprises two data switches 63 and 64, which are similar to the switches 43, 45 discussed above. Links 67 and 69 provide a dual interconnection between the two data switches 63 and 64. Optical fiber pairs 55 connect the switches of the different M-POPs 41 and 51 together and connect to the M/G-POP 53, to thereby form a redundant, two-way optical fiber ring, that is to say the backbone distribution ring 50 (FIG. 2).

The preferred embodiment of the G-POP portion 71 of the M/G-POP 53 comprises a pair of Juniper M40 routers or similar capacity data switches 73 and 75. The data switches 73, 75 of the G-POP 53 provide actual connection to the wider area packet data network, typically the public Internet, via one or more networks of backbone ISPs, such as the networks 77 and 79 of QWEST and LUNET. Alternatively, the routers or data switches 73, 75 providing the linkage to the Core network may be at a separate location, so as to form a separate G-POP. OC-12 (IP over SONET) links 81 and 83 connect the core routers or switches 73, 75 of the G-POP 71 to the networks 77 and 79 of the backbone ISPs. Preferably, these links are giga-bit Ethernet, but they may use SONET, to insure compatibility with those legacy networks.

Each switch 73 or 75 makes peer connections through the network 77 or 79. The network comprising the access ring(s) 30 and the distribution ring(s) 50 advertise their routes to peers on the Internet, and the other entities on the Internet advertise their routes, including advertisement to the network comprising the access ring(s) 30 and the distribution ring(s) 50. OSPF routing over the BlackDiamond platforms 43, 45 and over the Summit E-POP platforms 33 routes the customer traffic to the G-POP switches 73 and 75, where BGP4 speakers on the Juniper routers 71, 75 advertise the carrier's address space to the peers on the public Internet, e.g. via network 77 or network 79. A peering arrangement is negotiated to send and receive these advertisements. In addition, the G-POP routers 71, 75 in a number of separate regions form a confederation of logical iBGP peers, which appears as a single combined autonomous system to other networks on the Internet. The network carrier assigns a public IP address space for the Internet customers.

The network services include several broad classes or types of customer service. The first type of service is a metro-area network or MAN service that is a LAN extension or LAN-to-LAN service between business locations, based on Layer 2 connectivity. As discussed more below, the network supports a number of different variations of the MAN service. The other general type of network service is NET service (high-speed Internet service). With the NET service, a customer on a PC or similar type of end user device $31_1$ communicates through the access ring 40, the distribution ring 50 and one of the ISP backbone networks 77 or 79, with the desired Internet site, for example with a web server 85 (FIG. 3) using a standard web browser and Layer 3 routing. Both MAN service and NET service are scalable from 1 Mbps to 1 Gbps, in 1 Mbps increments. It is also possible to designate certain services as "Time Critical," and the network will prioritize the communications to such services, accordingly.

The Time-Sensitive services, in general, will follow the same forwarding schemes as the corresponding service types (Internet or LAN-Extension). However, the queuing for these services will be different on the backbone network to assure a dedicated bandwidth and QoS will be applied to these applications. A QoS profile has been reserved for these services on the backbone switches.

Layer 1 of the Ethernet protocol is a physical layer signal protocol for data communication over twisted pair. Layer 2 of the Ethernet is the MAC layer addressing and framing protocol, which indicates where to send the frames. The inventive network utilizes Layer 1 and Layer 2 elements of the Ethernet protocol throughout the various rings 30, 50 and for communication to and from the customer premises. The connectivity for the MAN services, for example, relies on layer-2 protocol switching functions.

The network uses native IP over the Ethernet, so that it will route all IP protocols. A Customer can connect directly to an E-POP switch, and traffic will be routed to the correct destination. In order to provide different QoS profiles, IP traffic can be sorted by either Destination IP address, Destination Subnet, or IP protocol (in the IP header) and mapped to one of three QoS profiles. This ensures that QoS profiles such as minimum guaranteed bandwidth and minimum latency can still be guaranteed to each Customer, even when other customers may be generating heavy Internet traffic or other heavy usage.

Protocols—General Discussion

Figure 4:
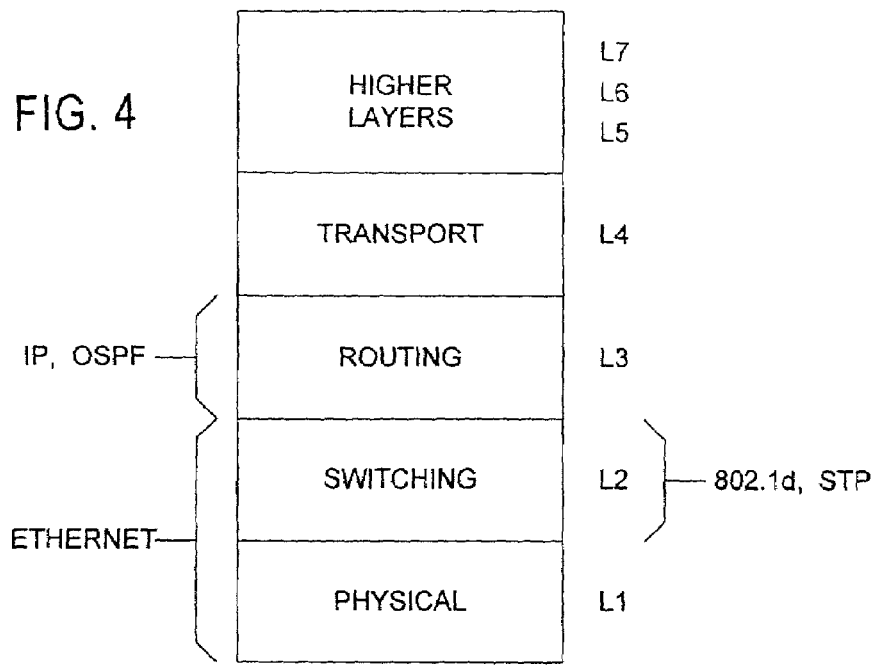
FIG. 4 illustrates a protocol stack and identifies several protocols in the stack, which are utilized in inventive manners in the network.

From the discussion above, it should already be apparent that certain aspects of the invention relate to utilizing native Ethernet throughout the network, without underlying protocol layers. Other aspects of the invention relate to certain new uses of related protocol elements, to support this use of Ethernet in the multi-ring metropolitan network architecture. The network uses native IP routing on top of Ethernet. To insure full understanding on these points, it may be helpful to consider the protocol layer definitions, with particular reference to the illustration of the preferred layers in FIG. 4. The International Standards Organization (ISO) Open Systems Interconnection (OSI) reference model specifies a hierarchy of protocol layers and defines the function of each layer in the network.

The lowest layer defined by the OSI model is the physical layer (L1). This layer provides transmission of raw data bits over the physical communication channel through the particular network. The layer defined by the OSI model next to the physical layer is the data link layer (L2). The data link layer transforms the physical layer, which interfaces directly with the channel medium, into a communication link that appears error-free to the next layer above, known as the network layer (L3) that provides the logical switching. The data link layer performs such functions as structuring data into packets or frames, and attaching control information to the packets or frames, such as checksums for error detection, and packet numbers. In the inventive network, the data link layer (L2) provides frame switching services, whereas the network layer (L3) provides IP packet routing functions.

The Ethernet L1 protocol elements essentially define the encoding of the ones and zeros for application to a line. The Ethernet L2 protocol elements define the framing structure and in some cases any multiple-access procedures for allowing multiple devices to access each individual shared line. Layer 2 also provides mechanisms for segregating traffic of multiple customers that may share a portion of the network, for example, into virtual local area networks (VLANs).

In accord with one aspect of the invention, the links from the end user system 31 to the E-POP data switches 33 utilize elements of Ethernet for the physical layer (L1) and link layer (L2) protocols, that is to say the L1 and L2 elements of either 10Base-T, 100Base-T or Giga-bit Ethernet. The communications through the access ring 30 and the backbone distribution ring 50 utilize L1 and L2 elements of the Giga-bit Ethernet protocol for direct application to the optical wavelengths carrying the frames over the fibers 39 and 55. As noted above, this approach eliminates L1 and L2 protocols that typically have been used in wide area optical networks to transport Ethernet frames, such as ATM and SONET.

Certain aspects of the invention involve manipulation of L2 and L3 protocol elements, as discussed in detail below.

To complete the discussion of the overall protocol stack, in the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities. Above the session layer, a presentation layer (L6) serves to represent information transferred between applications in a manner that preserves its meaning (semantics) while resolving differences in the actual representation (syntax). A protocol (L7), which is specific to the actual application that utilizes the information communicated, runs at the top of the protocol stack.

The network utilizes OSPF (Open Shortest Path First) as a routing protocol for IP traffic, that is to say as part of Layer 3 (L3) of the protocol stack. For IP only services, the network uses OSPF routing protocol to take care of the different IP paths available through the network and selects the best path for each communication, at the IP routing level of Layer 3. For multi-protocol services, the network utilizes a learning bridge protocol IEEE 802.1d. The network also utilizes STP (spanning tree protocol) as part of the Layer 2 switching protocol, particularly to manage the redundant operations in the backbone ring 50. Several aspects of the protocols in the network that have been outlined above are particularly unique. To insure understanding of some of those unique aspects, the use of several of these protocols are discussed in more detail later with respect to the specific services they support.

Metro-Area Network (MAN) Service

The MAN service provides a transparent Layer 2 connectivity between different sites of an enterprise customer. To all of the end user equipment 31 of such a customer, it appears that they are communicating with each other via a private LAN. In its simplest form (FIG. 2), the virtual connection extends across the access ring 30 between different sites, to allow transparent LAN extension service between the PC $31_1$ at a first location and another computer $31_2$ at the customer's other location, in the illustrated example. The virtual private networks offered by this service, however, may extend to customers on other access rings 30 coupled to the same backbone distribution ring 50 or even to other customer locations through different distribution and access rings.

The inventive network offers MAN services in three different flavors. The first is an Intra-regional LAN-Extension service, based on VLANs. Spanning Tree Protocol (STP) is used for loop-elimination in the BlackDiamond backbone ring 50. The next such service provides an IP-only Inter-Regional LAN-Extension, which uses a VPN (virtual private network) device (Netscreen) in the customer premises to tunnel the customer IP datagrams through the network. The customer IP traffic is encapsulated in packets with source/destination IP addresses belonging to the network operator's address space. The resultant datagrams then are routed to the destination and de-capsulated by the VPN device in the destination E-POP switch 33. Static IP routing will be used, in the VPN devices, to map two or more customer sites to each other. The other LAN-Extension is a Multi-Protocol Inter-regional service, which relies on routers configured for routing and tunneling for the routable protocols (IP, IPX, Appletalk, Decnet) and Data Link Switching Plus (DLSW+) for the SNA and Netbios.

For the Intra-regional (VLAN) LAN-Extension service, a VLAN is defined to connect all of the customer sites to support this service. In order for the VLAN connected sites to function properly, all of the IP, IPX, AppleTalk networks on the connected sites share the same network number. If this is not the case for a customer, a router is required to route between the different networks in the VLAN (every packet that requiring to go from a network to another needs to pass through the router). It is also possible (for IP and IPX) to define separate VLANs for the different sites and route between the VLANs on a summit or Black Diamond level.

The VLAN routing function for LAN-Extension services can be performed on any switch along the path between two sites. The best place to perform this function depends on the topological and network requirements of specific customers and should be tailored appropriately. Here are the general service characteristics of this type of service:

End-to-end VLANs for Intra-Ring, Intra-M-POP and Inter-M-POP LAN-extension clients.

Inter-Regional LAN-Extension customers with routable protocols (IP, IPX, Appletalk, Decnet) may experience problems if they have separate network numbers in different sites. A routing function is required to rectify this problem.

Spanning Tree will run on the Black Diamond backbone (M-POP) switches, for managing the Gigabit Ethernet link redundancy in the Rings and in the backbone. Summit switches in the E-POPs will not run STP.

Since STP is not running on the Summit switches, there is no awareness of the path changes on the intermediate switches causing forwarding problem for learning bridges. To avoid this problem, we reduce the aging timer to 30 sec (from 300 sec. Default).

No routing or bridging will be permitted among the different customers VLANs.

Customer VLANs will be tagged by 802.1 Q in the backbone, and customer VLANs may be tagged or untagged in the Access Summit switches.

In the case that customer requires routing for IP and IPX, different VLANs will be defined for different sites and routing will be configured among those VLANs on a switch along the way. Selection of routing switch and scope of VLANs should be customized to optimize the customer network.

For the Inter-Regional IP-only LAN-Extension service, VPN devices (Netscreen) tunnel customer IP traffic through the IP network among different sites. This is required for isolating different customer traffics from each other and also avoiding IP addressing conflicts which may be caused by the customers private addressing overlaps. Static IP routes, on the VPN devices, are used to make this connectivity possible. Note that the customer sites, in this case, need to be in different subnets.

Next, we will discuss the protocols as they specifically relate to the MAN service, in more detail.

Learning Bridge and Spanning Tree Protocol (STP)—L2 Switching

Ethernet switches used in the illustrated network segregate a network into a number of virtual local area networks (VLANs), for example to support several variations of the MAN service. In general, in a VLAN mode of operation, data switches transport frames (encapsulating packets) back and forth between terminal stations designated as members of a particular VLAN. However, the switches of the network do not transport the packets for the VLAN members to any other terminal stations. In this manner, the capability exists for creating logical workgroups of users and their shared resources (servers, printers, etc.), which may be physically separated from each other. Members of a workgroup may be coupled directly with one switch in the local area network, while other members or equipment of the workgroup may be coupled to one or more remote networks that are linked to the switch at a network port. VLAN groupings can provide privacy and security to their members while enabling "broadcast domains" whereby broadcast traffic is kept "inside" the VLAN.

Where the switches implement two or more virtual local area networks (VLANs), the switches must distinguish the frames for members of one VLAN from frames for members of a different VLAN and from frames for devices not associated with any one VLAN. All VLAN frames may be tagged with data identifying the particular VLANS. Hence, data frames communicating within a VLAN may contain information that identifies the VLAN grouping, or VLAN type, and the particular VLAN ID. Such information, or "tag," is provided as additional fields in the frame header. The frame format for such packets is expanded relative to the standard frame format. For example, the Ethernet ANSI/IEEE 802.3 standard specifies the untagged frame format and the 802.1d standard specifies tagged frame format. IEEE 802.1P also provides priority tags in the Ethernet frame headers. The data switches queue the frames in accord with these priority tags.

The data switches, for example the switches 33, 43 and 45 in the E-POPs and M-POPs switch Ethernet frames on and off the rings and through the rings based on Layer 2 functionalities. The inventive network utilizes IEEE 802.1d as part of the Ethernet protocol, at the L2 or MAC layer of the protocol stack. One aspect or module of this switching protocol, running in the data switches, implements a learning bridge functionality.

Each data switch operating as a learning bridge maintains an address table, associating the address of each device with the identifier of the port of the switch on which the device resides. The switch automatically learns associations from monitoring of the source MAC addresses of frames that are received on each port. The switch adds the dynamically detected addresses and associated port numbers to its address table. As stations are added to the network, the switch automatically updates the address table by adding new entries. As stations are removed from the network, the switch automatically removes entries from the address table which are currently not in use, based on a lack of activity longer than a predetermined aging period.

Each data switch can forward and flood frames in accord with IEEE 802.1d. In general, a switch forwards frames directly between any combination of ports, based on the destination address of the received packet, using the address table to determine which port the destination address resides on. If the destination address is not currently listed in the address table in the switch, the switch sends the frame out through all of its ports (floods the frame). This ensures that the packet will arrive at its destination even when the switch does not know on which port the destination address resides.

In the illustrated network, each data switch 33 running a learning bridge module, monitors traffic passing therethrough, and from that monitoring, the data switch detects source addresses. Specifically, the data switch 33 learns the Ethernet MAC address of each device sending data through the network via the particular data switch. From this address data, the switch essentially learns the MAC addresses of the devices on the respective links, that is to say the MAC addresses of the various end user devices 31 communicating through the respective E-POP and the MAC addresses of end user devices transmitting frames around the ring 30 through the other E-POPs.

Each time a switch 33 receives an Ethernet frame through the ring 30, the switch examines the destination address. If the destination MAC address is one that the switch recognizes as identifying an end user device 31 that communicates through that switch, based on the learned address data, the switch 33 routes the frame out the appropriate end-user port going to that device. The switch 33 may also recognize a destination MAC address as one requiring further routing around the access ring 30. Essentially, if the particular switch 33 has received packets through a particular port to a fiber 39 with the MAC address in the source field, when the switch receives a frame with that MAC address in the destination address field, the switch transmits the frame through the port to the respective fiber 39 to the next switch 33 on the access ring 30. In this manner, the switch transmits the frame in a direction around the ring, which it also learned from monitoring of MAC addresses, that is to say in the direction from which it had previously seen traffic coming from the particular MAC address. The switches 43, 45, 63, 65 in the M-POPs similarly learn which side of each ring has originated traffic from each MAC address. If a frame does not contain a destination MAC address that the switch recognizes, the switch floods its output ports with the frame.

The learning bridge functionality under IEEE 802.1d normally operates only in star or tree topology networks, where there are no loops. The learning bridge for Layer 2 switching functions, i.e. under IEEE 802.1d, can learn only one link for each MAC address. The learning bridge approach (IEEE 802.1d) normally can not learn switching through redundant links. Around a ring, there are two paths to a given destination, one in each direction. Spanning tree protocol (STP) is used to eliminate redundant links from tables used to control logical switching or forwarding of frames.

STP (spanning tree protocol) is a Layer 2 link management protocol that provides path redundancy while preventing undesirable loops in the network. For an Ethernet network to function properly, only one active path can exist between two stations. Spanning tree protocol automatically configures a loop-free topology in a bridged environment, to eliminate the potential that a packet could be caught in an infinite loop on the network.

The STP functionality serves to decide which one of any two or more redundant links will remain logically active for purposes of further communication with certain destinations. Other links to the destinations are logically blocked in the Layer 2 frame forwarding tables. Spanning-Tree Protocol operation is transparent to end stations, which are unaware whether they are connected to a single LAN segment or a switched LAN of multiple segments.

STP normally requires a configuration in which every element on the network is within one spanning tree domain. In the network, this would normally mean that the end user equipment 31, the E-POP switches 33, the M-POPs 41 and 51 and the M/G-POP 53 would all need to be within one spanning tree domain.

A spanning tree protocol agent is implemented in an Ethernet data switch in conformance with the IEEE 802.1d standard. The spanning tree protocol agent causes a switch to use the port with the most efficient path. This port is then called the root bridge. The switch effectively turns off the other port, to prevent a redundant loop. If one network segment in the network becomes unreachable, or if Spanning-Tree Protocol costs/performance parameters change, the spanning-tree algorithm reconfigures the spanning-tree topology and reestablishes the link by activating the standby path.

All switches in an extended network domain participating in Spanning-Tree Protocol gather information regarding other switches in the network through an exchange of data messages, referred to as bridge protocol data units (BPDUs). This exchange of BPDUs enables the election of a unique root switch for the stable spanning-tree network topology and well as the election of a designated switch for every switched segment of the spanning tree domain. The Spanning-Tree Protocol root switch is the logical center of the spanning-tree topology in a switched network. The exchange of BPDUs also causes the switches to remove loops in the network by placing redundant switch ports in the inactive or backup state. All paths that are not needed to reach the root switch from anywhere in the switched network are placed in Spanning-Tree Protocol backup mode.

In the inventive network, all of the fiber links in the access ring and the backbone ring comprise at least two fibers operating in parallel. For purposes of spanning tree protocol, if the parallel fibers represented redundant links, the STP agents would place one link in each fiber pair in the Spanning-Tree Protocol backup mode. However, in the inventive network, the data switches run in such a fashion as to aggregate the capacity of the parallel fiber links. To the spanning tree agent(s), each fiber pair logically is treated as a single port or link having a total bandwidth equal to the aggregate or total capacity of the two fibers. As the network capacity increases, it is a simple matter to add additional parallel fibers and/or additional wavelengths on each fiber to further increase the capacity in each aggregated pipe.

Normally, STP agents must run on all switches in a network. In a network of the size and complexity of the inventive network, this introduces undesirable cost and complexity. Also, the link learning processes of STP require time for all switches to converge after any change in the data, that is to say until all of the switches have learned the same new routing topology information. For example, if a link goes down, each switch on an end of the link knows and can update its STP routing information, i.e. making the failed link inactive and activating the redundant link that may have been previously blocked. Other switches, however, must learn of the change in status of the effective links. Essentially, the STP agents running on the switches on the effected link must notify agents on neighboring switches, which in turn notify their neighbors, etc., until all switches learn of the new status of the links. The larger the number of switches in the network, the longer will be the time required to teach all the switches in the network, that is to say the longer will be the time to STP convergence.

To avoid this problem, the inventive network runs STP only on the backbone ring 50, that is to say only in the M-POPs 41, 51 and the M/G-POP 53. STP manages the Gigabit Ethernet link redundancy in the access rings 30 as well as in the backbone ring 50. The Summit switches 33 in the E-POPs, however, do not run STP. Since STP is not running on the E-POP switches 33, there is no awareness of the path changes on the intermediate switches, which can cause forwarding problems for learning bridges implemented using IEEE 802.1d on those switches 33. To eliminate this problem, the learning bridge aging timer is set to a much lower assigned value that normal, for example down to approximately 30 sec or even less (from the normal 300 sec. Default for the learning bridge protocol 802.1d).

The switch implementing the learning bridge will keep learned information about a particular MAC address for a maximum predetermined time. If the aging timer for the information reaches the set Default, without any update in association with that MAC address, the switch discards the information. Stated another way, if the switch does not "hear" any frame transmissions from the device associated with the MAC address within the maximum time limit, the switch assumes that the learned data about that address is outdated. In the inventive network, the learning bridge protocol aging timer function is reduced from the normal Default of 5 minutes (300 sec.) to just 30 seconds. If a switch does not receive a frame carrying a particular MAC address for 30 seconds, it discards the data relating to that address in its table. Subsequently, if the switch receives a frame with the MAC address in the destination field, the switch floods the frame on all of its output ports.

Figure 5:
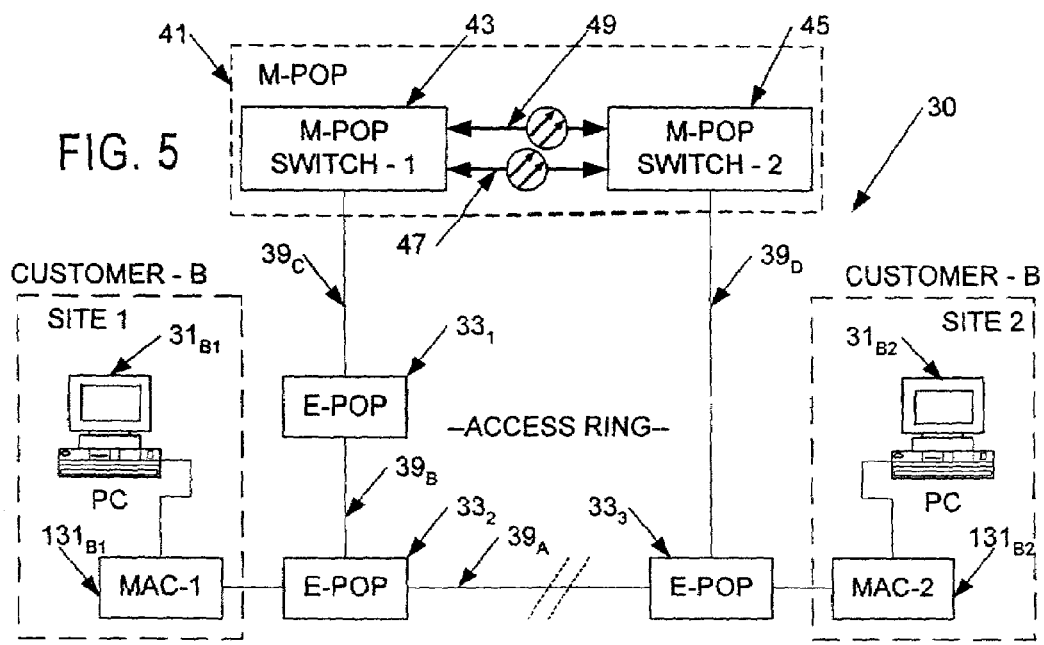
FIG. 5 is a simplified functional block diagram of an access ring of the network and two sites of one customer, linked via a LAN extension service through the network, which is useful in explaining certain inventive routing/switching techniques.

To appreciate the learning bridge and spanning tree operations, in accord with the invention, it may be helpful to consider a simple example with regard to FIG. 5. The drawing shows a portion of one of the access rings 30, including the M-POP 41 and three of the E-POPs 33. Assume that a customer B has two different sites within a metro area, and the customer B subscribes to the MAN service through the ring 30. Site 1 includes end user equipment, represented for example by the PC $31_{B1}$. The PC $31_{B1}$ connects through an appropriate interface $131_{B1}$ and a twisted pair cable to an E-POP $33_2$ on the access ring 30. The interface $131_{B1}$ has a first, unique MAC address (MAC-1) at protocol Layer 2, for Ethernet switching purposes. Similarly, Site 2 includes end user equipment, represented for example by the PC $31_{B2}$. The PC $31_{B2}$ connects through an appropriate interface $131_{B2}$ and a twisted pair cable to an E-POP $33_3$ on the access ring 30. The interface $131_{B2}$ has a second, unique MAC address (MAC-2) at protocol Layer 2, for Ethernet switching purposes.

Each of the switches $33_1$, $33_2$, $33_3$, 43 and 45 monitors source MAC addresses in frames communicated on the access ring 30. In this manner, the E-POP $33_2$ learns that the MAC-1 address of interface $131_{B1}$ is on the customer link to Site 1. The E-POP $33_2$ also learns that the MAC-2 address of interface $131_{B2}$ is sending packets to the E-POP $33_2$ via the fiber link $39_A$ between the E-POP $33_2$ and the E-POP $33_3$. Similarly, the E-POP $33_3$ learns that the MAC-2 address of interface $131_{B2}$ is on the customer link to Site 2. The E-POP $33_3$ also learns that the MAC-1 address of interface $131_{B1}$ is sending packets to the E-POP $33_3$ via the fiber link $39_A$ between the E-POP $33_3$ and the E-POP $33_2$. Both E-POPs populate their MAC address forwarding tables based on their monitoring of the MAC source addresses in the frames received via the respective ports.

Assume, for example, that the PC $31_{B1}$ sends packets in frames to the PC $31_{B2}$. The frames have the MAC-2 address as the destination address and the MAC-1 address as the source address. The E-POP $33_2$ receives the frames from the interface $131_{B1}$ and normally sends those frames directly over the fiber link $39_A$ to the E-POP $33_3$ using previously learned routing information from its table. The E-POP $33_3$ in turn forwards those frames to the interface $131_{B2}$, which delivers the frames to the end user device, PC $31_{B2}$. In the opposite direction, the PC $31_{B2}$ sends packets in frames to the PC $31_{B1}$. The PC $31_{B1}$ sends the frames to interface $131_{B1}$, which delivers them to the E-POP $33_3$. The E-POP $33_3$ normally sends those frames directly over the fiber link $39_A$ to the E-POP $33_2$ using previously learned routing information from its table. The E-POP $33_2$ sends the frames to the interface $131_{B1}$, which in turn supplies the frames to the PC $31_{B1}$.

For discussion purposes, assume now that the link $39_A$ between the E-POP $33_2$ and the E-POP $33_3$ is cut or otherwise fails, as shown by the dotted lines across that link. The E-POP $33_2$ no longer receives frames bearing the MAC-2 address over the link $39_A$; and the E-POP $33_3$ no longer receives frames bearing the MAC-1 address over that link. After the aging timer times out, the E-POP $33_2$ discards its learned data regarding the MAC-2 address; and the E-POP $33_3$ discards its learned data regarding the MAC-1 address. However, until the aging timer exceeds its set limit, normally 5 minutes, both of these E-POPs attempt to send data for the respective Sites over that link.

In the prior network architectures, the STP functionality run on the switches would cause switches to use an alternate link, when one link failed, to avoid loss of data during the period between the link failure and the expiration of the aging timer. As noted, however, scalability and convergence issues make it impractical to use STP in the E-POP switches 33.

Instead, in the inventive network, the E-POP switches 33 use an aging timer Default limit set-down to just 30 seconds. During the 30 second timer interval, in our example, the E-POPs $33_2$ and $33_3$ will send data over the dead link $39_A$. However, at the end of that interval, the E-POPs $33_2$ and $33_3$ will discard the old data and will flood the access ring 30 with any new frames destined for the affected addresses.

In our example, the E-POP $33_2$ will flood the next subsequent frame containing the MAC-2 destination address over the links $39_A$ and $39_B$. Since the link $39_A$ is down, the transmission over that link fails. However, the frame with the MAC-2 address sent over the link $39_B$ does reach the E-POP $33_1$. The E-POP $33_1$ executes a similar learning bridge logic. Since its timer for the relevant address (MAC-2) also will have expired, the logic will cause the E-POP $33_1$ to transmit a copy of the frame over the link $39_C$ to the switch 43 in the M-POP 41. As its transmits this copy, it also updates its records with regard to the MAC-1 source address, to maintain a current indication that frames for that address should go through the link $39_B$.

On the access ring 30, the two M-POP switches 43 and 45 are the only two switches implementing the spanning tree protocol. With all links 39, 47 on that ring operational, there would be a redundant loop, so the STP agents in those switches keep one link in a standby inactive state, for example the link $39_D$. When one of the fiber links 39 fail, such as the link 39A in our example, the switches 43 and 45 reconfigure their spanning tree data accordingly. The switches 43 and 45 now place the link $39_D$ in an active state. Because of the break in the ring, there is no redundancy. Also, when the frame with the MAC-2 destination address reaches the switch 43 via the link $39_C$, the two M-POP switches 43 and 45 communicate via the now active link $39_D$ and forward that frame to the E-POP switch $33_3$, for delivery to the end user device as discussed earlier.

Similarly, when its aging timer for the MAC-1 address expires, the E-POP $33_3$ will send the next subsequent frame containing the MAC-1 address over the links $39_A$ and $39_D$. Since the link $39_A$ is down, the transmission over that link fails. However, the frame with the MAC-1 address sent over the link $39_D$ does reach the switch 45 in the M-POP 41, which now considers that link to be active. When this frame reaches the switch 45 via the link $39_C$, the two M-POP switches 43 and 45 communicate via the link 47 and forward that frame over the link $39_C$ to the E-POP switch $33_1$.

In our example, when the frame from Site 1 reaches the E-POP $33_3$, with the MAC-2 address, the E-POP $33_3$ forwards the frame to the interface $131_{B2}$, which delivers the frame to the end user device, PC $31_{B2}$, in the normal manner. However, the newly received frame includes the MAC-1 address as the source address. Upon receiving the frame, the E-POP $33_3$ makes a new entry in its address table, indicating that communications to/from the MAC-1 destination address now travel via the port associated with the link $39_D$. Similarly, when the frame from Site 2 reaches the E-POP $33_2$, with the MAC-1 destination address, the E-POP $33_2$ forwards the frame to the interface $131_{B1}$, which delivers the frames to the end user device, PC $31_{B1}$, in the normal manner. However, the newly received frame includes the MAC-2 address as the source address. Upon receiving the frame, the E-POP $33_2$ makes a new entry in its routing/switching table, indicating that communications to/from the MAC-2 address now travel via the port to the link $39_B$.

The STP functionality in the M-POP 41 is sufficient to manage the link redundancy in the access rings 30. It has been found that with a 30-second aging timer limit, the learning bridge functionality of the switches in the access ring will re-converge within 45 seconds after a link failure. The M-POPs and the M/G-POP run spanning tree protocol with respect to the backbone distribution ring 50. However, because of the smaller number of switches, the convergence of the spanning tree information occurs relatively quickly.

Time-Sensitive IP Service

As discussed earlier, the inventive network supports Internet and MAN services. The inventive network also supports Time-Sensitive IP Service and carries various network-management and signaling related traffic.

The Time-Sensitive IP Service supports voice and video applications that are normally recognizable by their UDP port and in many cases they need to be forwarded to a group of users (multicast or broadcast). From the forwarding point of view, these services use IP routing or VLAN services the same way other services are provisioned. They also may use IGMP and PIM-DM for multicast services. From a QoS viewpoint, however, they are assigned to a separate QoS profile (QP3) on the BlackDiamond switches 43, 45 in the backbone ring 50. The criteria to distinguish them on the BlackDiamond level is source/destination IP address as well as source/destination UDP/TCP port, depending on the specific application.

Traffic Segregation to Support QoS

The inventive network implements Quality of Service (QoS) on the trunks of the access rings 30 and the backbone rings 50, in a deterministic fashion to support guarantees of specific levels of service to the network customers. On the trunks of the access rings 30 and backbone rings 50, the traffic on the trunk links for example may be segregated into four types of traffic and prioritized as follows:

| Type | Min | Max | Priority |
|---|---|---|---|
| Internet Traffic | 0% | 50% | Low |
| MAN Traffic | 0% | 20% | Normal |
| Time-Critical Traffic | 0% | 20% | Medium |
| Management/Signaling Traffic | 0% | 10% | High |

At present, the traffic is segregated into four classes. Those skilled in the art will recognize that other numbers, classes, priorities and allotted capacities are possible.

Each type of service may consume up to the maximum allotted percentage of the trunk capacity of the ring. As can be seen by the exemplary percentages, however, there is no over-subscription. There is no situation in which one traffic can dominate the others and steal additional capacity. Allocation in this manner allows the carry to offer and consistently provide capacity for its customers in accord with individual service level agreements (SLAs).

Rate Controls

The switches in the M-POPs and M/G-POPs on the backbone ring 50 implement limits on each customer's downstream communications through the backbone and access rings, to conform to the respective SLA. Also, these are the switches that segregate and prioritize traffic on the trunk links, as outlined above.

In the upstream direction, the E-POP switches 33 throttle the customer transmission in accord with the SLAs. For example, for a particular Internet service customer, the E-POP switch 33 serving the particular customer is provisioned to accept only a certain amount of upstream traffic, per unit time, on the port coupled to the Internet equipment of the particular customer. Packets received at a higher rate are dropped into a bit bucket. In the preferred embodiment, the service specifications for the customers may be purchased in increments as small as 1 Mb/s, from 1 Mb/s up to 1 Gb/s.

Higher protocol layers, above layer 2, offer a variety of different forwarding services. For example, Internet service is a Layer 3 service, using IP address routing at Layer 3. MAN service utilizing VLAN techniques as discussed above is a Layer 2 service.

Time critical service is identified by a UDP port identifier, at Layer 4. The UDP port identifier identifies the particular application intended to receive the IP packets. Time critical applications have unique UDP port identifiers recognizable by the Juniper switches and BlackDiamond switches used on the backbone ring 50. Similarly, these switches identify Internet traffic based on IP addressing at Layer 3, and they identify MAN service frames by the presence of certain VLAN related information at Layer 2. Each switch on the backbone ring looks at the different layers of the IP and Ethernet protocol stack for the various frames of downstream traffic, identifies the traffic type classification for each frame, and places each frame into a respective one of four (or more) different queues corresponding to the traffic types.

All of the Internet services, together, can utilize up to 50% of the bandwidth. All of the VLANs can use up to 20% of the bandwidth, collectively. All of the time critical UDP services, together, can utilize up to 20% of the bandwidth, and management and signaling traffic can use up to 10% of the bandwidth. Stated another way, when the respective switch places the four types of traffic into the respective queues, the switch sequentially reads frames from the queues for transmission over the next link in accord with an the allotted bandwidth and priority. This makes each service modular and deterministic.

For traffic control from the M-POP to E-POP between M-POPs, the BlackDiamond switches in the M-POPs will receive traffic from the connected access ring as well as a portion of the backbone traffic. The QoS profiles on these switches is defined such that they can isolate the different traffic categories from each other to ensure that one service cannot affect the other services adversely. The QoS also should assign appropriate trunk bandwidth to each category of traffic. The following table denotes examples of QoS definitions which may be used in the BlackDiamond level:

TABLE 1

QoS Profile Definition on the Black Diamond Switches

| Qos Profile | Traffic Category | Traffic-Shaping Criteria | Minimum Bandwidth | Maximum Bandwidth | Priority |
|---|---|---|---|---|---|
| Qp1 | Internet | Default (Left Over) | 50% | 100% | Low |
| Qp2 | LAN-Extension | All VLANs and (Src IP range, Dst IP range) | 20% | 100% | Normal |
| Qp3 | IP Time-Critical | UDP/TCP Src/Dst port or Src IP range, Dst IP range | 20% | 100% | Medium |
| Qp4 | Reserved | Reserved | 0% | 100% | Low |

The following table outlines exemplary criteria for QoS enforcement on the Access Summit Switches:

TABLE 2

Qos enforcement Criteria on the Access Summit Switches

| Traffic Category | Traffic-Shaping Criteria | Comments |
|---|---|---|
| Internet | VLAN based | Min = 0, Max = XX, P = L |
| LAN-Extension | VLAN-based or/and (Src IP, Dst IP)-based | Min = 0, Max = XX, P = N |
| IP Time-Critical | (UDP/TCP Src Port/Dst port)-based Src IP range-based Dst IP range-based | Min = 0, Max = XX, P = M |
| Reserved | Reserved | |

The priority can be adjusted based on customers, it can be set to Low for all services if several different types of services share a QoS profile.

The definition for the QoS profiles are left as default on the backbone Summit switches. However, all Intra-Regional LAN-Extension VLANs should be assigned to qp2 since they are tagged. This is because the 802.1P tags will be maintained intact through the network and will have precedence over other QoS traffic shaping enforcements.

QoS Maximum & Minimum bandwidth is shared (aggregated) among all traffic groups sharing a QoS profile.

Default setting (qp1) will be used for the downstream direction for the Internet customers.

No guarantee is granted to the Internet users in the downstream direction. The aggregate Internet service, however, will get a certain percentage of the available bandwidth on the trunks. On the upstream direction, however, it is possible to guarantee the bandwidth in the Yipes network up to the entry to the Internet.

Traffic Engineering will control the bandwidth by assigning a trunk bandwidth of more than maximum aggregate bandwidth of all customers.

QoS for LAN-Extension customers will be enforced (port-based) on the 2 ends of the 2-point circuits or the end points of n-point circuits, in the E-POPs.

For the Internet customers, Qos will be enforced at E-POPs (port-based) and M-POPs (IP subnet-based).

The QoS on the access Summits will be enforced based on the Maximum bandwidth available to a customer. In this example, the CIR and the Burst rate will be identical and there is no provision of bursting over this rate for a customer. However, CIR and Burst rate may be separately provisioned at different levels.

The QoS definition on BlackDiamonds (M-POPs) to control the downstream and backbone trunks is based on Minimum Bandwidth available to each of the service types (Internet, LAN-Extension and Time-Critical services).

Traffic Engineering will be performed based on the CIR values as defined earlier in this section. The CIR aggregate for all customers will be less or equal the trunks bandwidth in the normal operations.

In the case of failure in network components, traffic will take the redundant paths through the network. Even during a network fault, due to traffic engineering, the network will still provide service at the guaranteed levels, for the duration of the fault.

Protocol Adaptations Supporting NET Service

IP routing is used for the Internet connectivity (NET service) and inter-regional LAN-Extension type services. Each device 31 communicating on the network has an IP address. The IP routing is based on the internal use of OSPF and the external use of BGP4. Each will be considered in turn. To understand the enhanced operations of the OSPF protocol in the inventive network, it may be helpful to briefly summarize the functions that OSPF offers.

Open Shortest Path First (OSPF)

The network uses OSPF as part of the IP routing protocol at the L3 layer of the protocol stack (see FIG. 4), that is to say to route data based on IP addresses contained in packets encapsulated within the Ethernet frames. The IP open shortest path first (OSPF) protocol is a Link State routing protocol, with a link advertisement procedure. Link State routing causes each router to build a link state packet (LSP), containing a list of its neighbors and an associated COST of using the next link path to each of those neighbors as the next hop. Each router sends its LSPs to its neighbors. Upon receipt of a neighbor's LSP, each router computes a route to each destination. In OSPF, the Opaque LSA (link state advertisement) packet configured with a link-local scope may be used to carry the tags associated with the route. OSPF supports equal-cost multipath. Also, OSPF capable routers can calculate separate routes for each IP type of service. OSPF authenticates all routing protocol exchanges.

OSPF is designed to run within a single Autonomous System. For OSPF purposes, each regional network consisting of a backbone ring 50 and the subtending access rings 30, forms one autonomous system. Each OSPF router maintains an identical database describing the Autonomous System's topology. From this database, a routing table is calculated by constructing a shortest-pathtree. OSPF has special restrictions when multiple areas are involved. If more than one area is configured, the backbone area must be configured as Area 0. All other Areas 1 to N must physically connect to Area 0, so that the backbone is essentially the center of all other areas. OSPF works on the basis that all areas inject routing information into the backbone and in turn the backbone disseminates that information into other areas. Consequently no one Area can be split; each Area must be continuous. If an Area were split, it would not be possible to advertise changes in the routing table from one side of the Area to the other.

Figure 6:
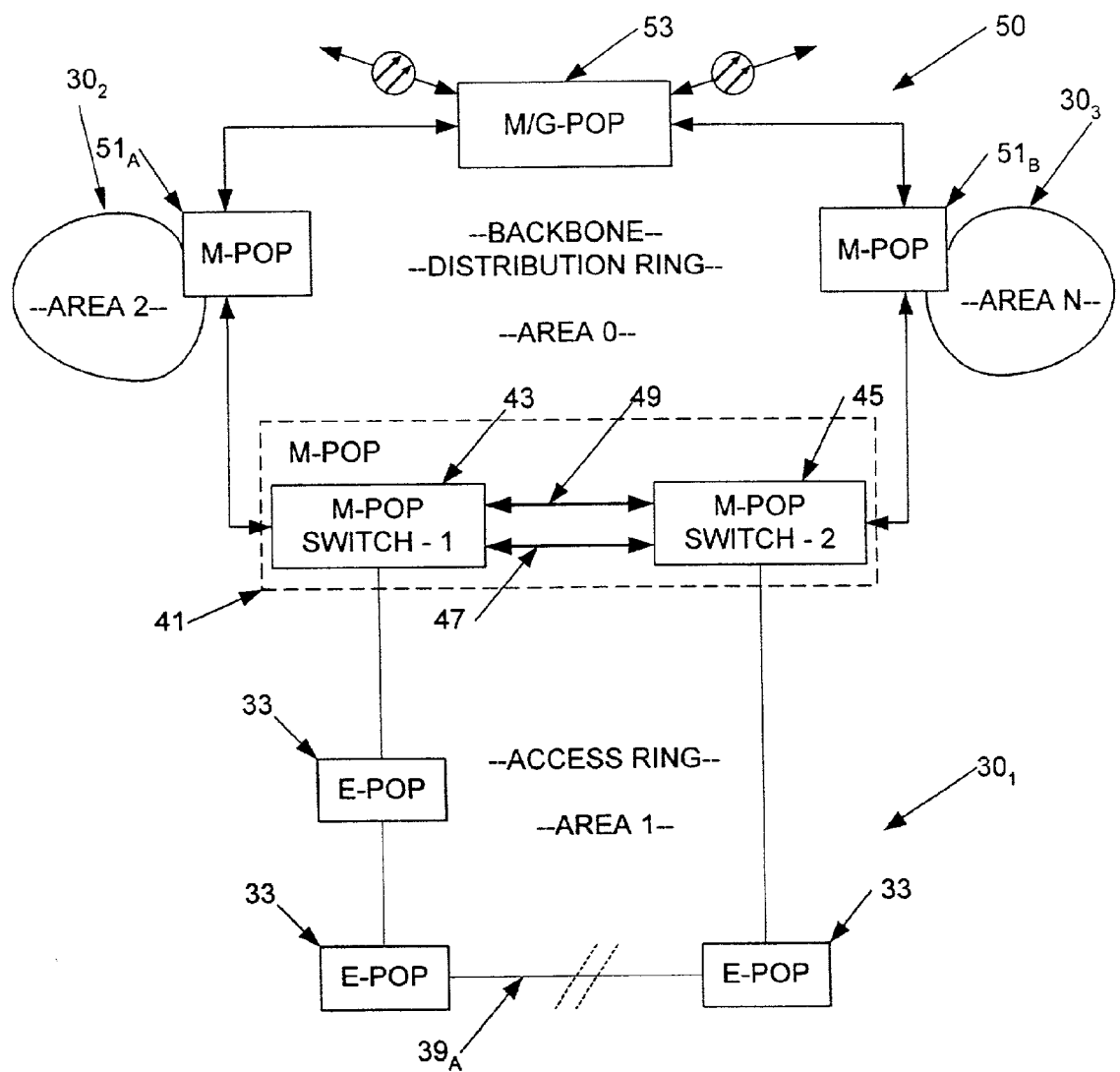
FIG. 6 shows a plurality of access rings and one backbone ring of the inventive network, and is useful in explaining certain inventive uses of the OSPF routing protocol within a region of the network.

FIG. 6 is a simplified block diagram of a regional portion of the network of FIGS. 1 and 2, useful in explaining the implementation of the OSPF routing protocol in that network. The illustrated portion of the network includes the regional backbone distribution ring 50. For OSPF purposes, the ring 50 is the backbone Area 0. The ring 50 includes the M/G-POP 53 and a number of M-POPs 41, 51. The M-POP 41 connects to a fiber access ring $30_1$, which includes a number of the E-POP edge switches 33 for communication to customer systems (shown in earlier drawings).

For discussion purposes, the drawing shows two other M-POPs $51_A$ and $51_B$ and the associated access rings 302 and 303. Each M-POP may connect to a plurality of access rings 30. For OSPF purposes, each access ring is designated as a different Area. In the example, the Access ring $30_1$ is designated Area 1, the access ring $30_2$ is designated Area 2, and the access ring 303 is designated Area N. The M-POPs connect the Areas 1–N to the backbone ring 50 of Area 0. Within each M-POP, one link between the two data switches is in Area 0. In existing OSPF networks, all links between switches connected to the backbone network of Area 0 are bonded elements of Area 0. In accord with an aspect of the invention, however, each M-POP 41, 51 includes another link between the two data switches, and that second link is bonded in the respective Area of the respective access ring 30.

For example, in the M-POP 41, the link 49 is bonded as an element of the backbone ring 50 of Area 0 for purposes of OSPF routing. The M-POP link 49 bonded to Area 0 insures that Area 0 is continuous and remains continuous even if one of the links of the ring 50 fails. The link 47 is bonded as an element of the access ring $30_1$ of Area 1. The M-POP link 47 bonded to Area 1 insures that Area 1 is continuous and remains continuous even if one of the links of the access ring $30_1$ fails. Without the link 47 in area 1, if a link between two of the E-POPs 33, such as the link 39A failed, one side of the ring $30_1$, would hang off the switch 43. The other side of the access ring $30_1$, would hang off the switch 45 as a separate disconnected section of Area 1. With the link 47 bonded to Area 1, the two sides of the access ring 30, still form a continuous Area for OSPF routing purposes. Similarly, if one of the switches 43, 45 fails, the access ring $30_1$ is still continuous and can continue to function, based on OSPF routing through the remaining switch and around the other side of the ring $30_1$.

The following list outlines the characteristics of the OSPF provisioning in an example of the inventive network:

The aggregate public IP addresses of the network domain will be advertised to the Internet community.

Each Region is provisioned as a single OSPF domain, even if it may span multiple G-POPs.

Each M-POP with all of the rings connected to that M-POP form a single OSPF area. The ring header M-POP switch and all of the backbone M-POP switches are in the area zero (backbone area).

Area zero is provisioned as a non-stub area.

All other areas are configured as Not-So-Stubby-Areas (NSSAs). This type of area is capable of translating LSA type 5 (external routes) to LSA type 7 and advertising into the NSSA area.

BlackDiamonds in the M-POPs are provisioned to allow for LSA type 5 to 7 translation.

OSPF is provisioned such that summary addresses will be permitted into the NSSA areas.

No redistribution from BGP to OSPF is performed. All necessary networks are advertised statically in BGP. No automatic synchronization is allowed between BGP and OSPF.

The IP addressing scheme is designed in a fashion that allows for the route summarization on the Area Boarder Routers (ABR). This enables a reduction of the routing tables to a manageable size.

The default COST for OSPF purposes is modified according to the following approximate formula:

$$COST = (10^{}6)/(Bandwidth^{}(\frac{1}{2}))$$

This can be approximated to the following table:

TABLE 3

Modified OSPF COSTs

| Type of Interface | COST | Comment |
|---|---|---|
| 56K | 4200 | |
| 64K | 2000 | |
| 128K | 2800 | |
| 256K | 2000 | |
| 512K | 1400 | |
| T1 | 800 | |
| 10M Ethernet | 300 | |
| 100M Ethernet | 100 | |
| 1 G Ethernet | 30 | |
| 10 G Ethernet Future | 3 | Future use |
| 100 G | 1 | Future use |

- Type 1 metric is used for the external routes (the total cost is the aggregate of the internal and external costs).
- There is no redistribution from BGP to OSPF. A default route is generated on the central G-POP router and is advertised in the domain.
- A VLAN is formed for OSPF configuration on each one of the Gigabit Ethernet ports and it is configured to ignore the Spanning Tree. This is to de-couple OSPF forwarding from STP forwarding in the presently preferred implementation.
- OSPF runs on the BlackDiamond switches (M-POPs) and on the Summit switches (E-POPs)
- OSPF and BGP also run on the Juniper switches (G-POP).
- Separate OSPF domains in each Metropolitan area.
- 4 to 8 Rings (Entire M-POP) are provisioned on a single area (with the assumption of 4 to
- 6 Summit48s on each ring). No more than 40 routers in an area.
- Maximum of 3 areas per BlackDiamond switch (M-POP).
- The trunks between the BlackDiamond and Juniper switches and between BlackDiamond switches belong to the area zero (backbone area).
- The BlackDiamond switches/routers in the M-POPs serve as Area Boarder Routers (ABRs).
- Trunk VLANs on OSPF must ignore STP.
- Juniper switches (G-POP) are entirely in the backbone area (area 0).
- Summit48 switches (E-POPs) are provisioned in a single area serving as an area router.
- Default route generation is performed on the M-POPs and distributed to E-POPs.

As noted in the preceding outline, each of the access rings forming Areas 1 to N is provisioned as a Not-So-Stubby-Area (NSSA) under the OSPF routing protocol. Area 0 is provisioned as a non-stub area. This aspect of the invention helps to isolate problems occurring in one access ring or Area from disrupting routing through the other areas of the single OSPF Autonomous System.

Each of the E-POPs 33 define static IP packet routing to the customer systems 31 served by the respective E-POP. Each such E-POP switch 33 sends out LSAs to advertise the static routes for the IP addresses of the customer systems 31 that it serves. For OSPF purposes, the static routes are "external" routes. Under OSPF, if an Area is a normal Area, the switches of the Area flood the route information within the Area and to the backbone Area 0. The flooded routing information includes static routing to external systems or networks. The routers of Area 0 in turn further distribute the information to the other Areas of the Autonomous System, that is to say to the other access rings in the illustrated network topology.

If a route or router becomes unstable, one or more routes repeatedly go up and then down (in and out of service), each effected router repeatedly floods the network with LSAs regarding the changed conditions. This consumes considerable CPU capacity of all of the OSPF routers. The provisioning of the access rings 30 as NSSAs isolates each access ring from such problems occurring in other access ring Areas.

With NSSAs, the route information is distributed throughout the affected access ring Area, e.g. Area 1 in FIG. 6. Also, route information is distributed throughout the backbone ring Area 0. However, the nodes between Area 0 and the other Areas will not re-distribute the static route information back down. For example, static route information from Area 1 would not be distributed down into Areas 2 to N. Hence, if there is a problem in one access ring, the flooding of route change information will not propagate into the other access rings.

Protection also is provided for the backbone ring, that is to say for Area 0, through the use of route aggregation at the M-POP level of the network. Route aggregation, for OSPF purposes, means that the routes within an area are advertised as an aggregate range, rather than as individual routes. In the exemplary portion of the network shown in FIG. 6, the M-POP 41 advertises the aggregate range of IP addresses from within access ring 30₁, that is to say Area 1, to Area 0 and to the other Areas 2 to N. Similarly, the M-POP 51$_A$ advertises the aggregate range of IP addresses from within access ring 30₂ (Area 2), to Area 0 and to the other Areas (1 and N); and the M-POP 51$_B$ advertises the aggregate range of IP addresses routing from within access ring 30₃, (Area N) to Area 0 and to the other Areas (1 and 2).

If a route within one of the access rings 30 is unstable and repeatedly goes up and down, the aggregate range of IP addresses and the attendant route information remains the same. For example, if the link 39A in access ring 30₁ repeatedly goes up and down, the aggregate range of IP addresses for the ring 30₁ and the attendant route information for Area 1 remains the same. The M-POP 41 has no change it needs to advertise. Hence, any change information caused by the instability does not propagate around the backbone ring of Area 0.

To protect each access ring itself, certain mission critical processes (e.g. routing control functions relating to STP, OSPF and BGP) are allocated a certain number of CPU cycles, on a guaranteed basis. The number of cycles that are reserved for OSPF, for example, are sufficient to allow convergence within a specified time that the carrier selects in order to provide the desired quality of service through the network. The OSPF then is protected from other processes that might consume an otherwise inappropriate amount of switch processor time. For example, if another device were pinging the switch an excessive number of times per second, it might otherwise rob processor cycles from the mission critical functions, such as OSPF. However, because of the reservation of processor cycles for the mission critical functions, OSPF and the other mission critical functions continue to operate normally.

Border Gateway Protocol (BGP)

The NET service for Internet access uses BGP in combination with the above-discussed OSPF protocol. To understand the enhanced operations of the Border Gateway Protocol (BGP) in the inventive network, it may be helpful to briefly summarize the functions that BGP offers.

The BGP protocol allows a network operator to create loop-free inter-domain routing between autonomous systems (ASs). The autonomous system for BGP purposes, however, is not the same as that for OSPF. For BGP, each AS is a set of routers under a single technical administration. In the inventive network, all of the carriers' regional networks together form one BGP Autonomous System, even though each regional network is a separate autonomous system for OSPF purposes.

Routers in an AS can use multiple interior gateway protocols to exchange routing information inside the AS and an exterior gateway protocol to route packets outside the AS. The iBGP portion of the protocol handles internal BGP communications, that is to say BGP communications within one autonomous system. The eBGP portion of the protocol handles external BGP communications, that is to say BGP communications between different autonomous systems.

BGP routers exchange network reachability information with respect to addresses within their domain. BGP uses TCP as its transport protocol. Two BGP routers form a TCP connection between one another, as peers, in order to exchange messages regarding route parameters. BGP uses a derivation of distance vector routing, referred to as path vector routing. The routing information exchanged between BGP layer peers includes a distance vector and destination address prefix. This information is mainly an indication of the full paths (BGP AS numbers) that a route should take in order to reach the destination network.

Two BGP routers become neighbors once they establish a TCP connection between each other. The TCP connection is essential in order for the two peer routers to start exchanging routing updates. Once the TCP connection is up, the routers send OPEN messages in order to exchange values, such as the AS number, the BGP version and the BGP router ID. After these values are confirmed and accepted the neighbor connection is established. If BGP messages are not received by one of the peers for some predetermined time, that router drops the session, which requires establishment of a new BGP peer session. To minimize the need to re-establish peer connections, the peer routers exchange keep-alive message, to ensure that the peer connection remains active.

BGP peers initially exchange full BGP routing tables and subsequently exchange incremental updates, for routing table changes. BGP keeps a version number of the BGP table, which should be the same for all of its BGP peers. The version number changes whenever the BGP agents in the switches update the tables. BGP operations require that the routers establish reachability for nodes within an AS, before advertising route information to external ASs.

The iBGP portion of the protocol handles internal BGP communications, that is to say BGP communications between peers within one autonomous system. The iBGP runs between peer routers inside an AS, to establish the reachability for nodes within the AS. The eBGP portion of the protocol handles external BGP communications, that is to say BGP communications between different autonomous systems. The external route distribution is performed by redistributing the BGP information for the AS to Internal Gateway Protocols (IGPs) running in the AS, for broadcast to other autonomous systems.

BGP also supports an implementation for large networks with widely distributed sub-systems, referred to as a "confederation." A confederation, for BGP purposes, is a group or collection of separately located mini-autonomous systems or "mini-ASs," which together form a single overall autonomous system. The confederation advertises a single AS number to BGP speakers in other autonomous systems. Each mini-AS uses a private identifier for BGP communications with other mini-ASs within the confederation. Intra-confederation BGP commands, that is to say between the mini-autonomous systems, have some aspects of eBGP and some aspects of iBGP, as should become apparent from later, more detailed discussions.

After a BGP agent receives updates about different destinations from different autonomous systems, the router will have to decide which paths to choose in order to reach a specific destination. A BGP router will choose only a single path to reach a specific destination. The decision process is based on different attributes, such as next hop, administrative weights, local preference, the route origin, path length, origin code, metric and so on, drawn from the BGP routing tables accumulated and maintained as outlined above. The routing may involve routing within a mini-AS, routing within a confederation between mini-ASs, or routing to independent autonomous systems of the public Internet.

Figure 7:
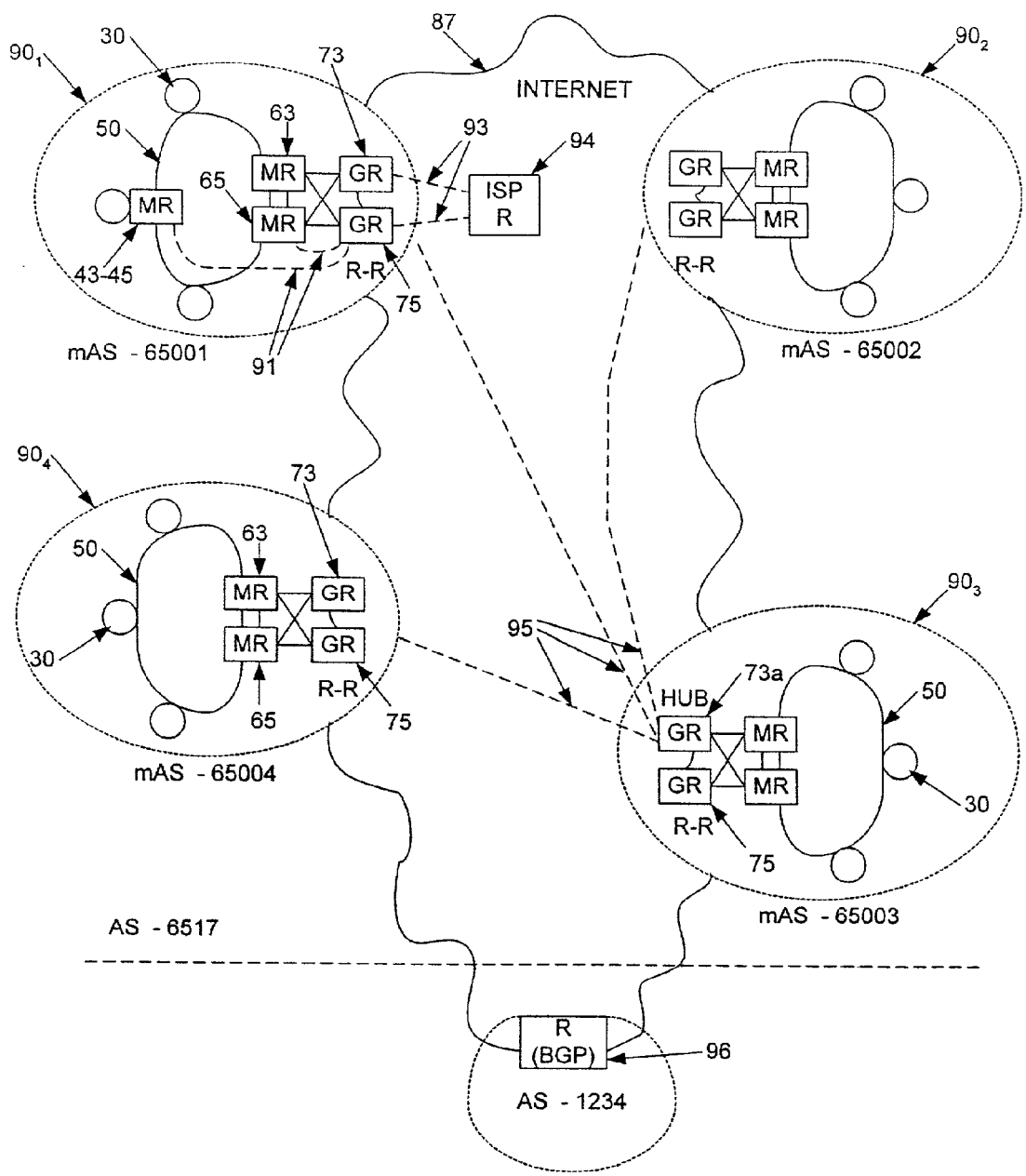
FIG. 7 is a higher level block diagram, showing interconnection of several of the regional networks through the Internet, useful in explaining aspect of the invention relating to manipulation of boundary gateway protocol.

The implications of BGP routing in the inventive network are described with respect to FIG. 7, wherein like reference numerals refer to the same elements as described above, although the nomenclature may have changed slightly. The drawing shows a number of regional networks 90, each comprising a number of access rings 30 and a backbone ring 50. FIG. 7 also shows the switch routers of the M/G-POP, represented in simplified form as two M-POP routers (MR) 63 and 65 interconnected with the two G-POP routers (GR) 73 and 75. In the inventive network, all of the regional networks together form one overall autonomous system, having a single AS number 6517 for advertisement to the public Internet using BGP. However, as shown, these regional networks are connected together to form a BGP confederation through the Internet 87.

A confederation, for BGP purposes, is a group or collection of separately located mini-autonomous systems, which together form a single overall autonomous system. The confederation advertises a single AS number to BGP speakers in other autonomous systems. A mini-AS is a logical group or collection of routers configured as BGP speakers, operating together, in some respects, as if they form an autonomous system. Within the confederation, mini-AS appears as a single BGP speaker, from the perspective of the other mini-AS systems.

In the widely dispersed autonomous system, each combination of a backbone ring 50 and a plurality of access rings 30 in a region 90 forms one "mini-AS." Hence, there are similar but logically separate mini-autonomous systems in the geographically separate regions. Recall also that FIG. 1 shows mAS-1 and mAS-2 in different geographic regions.

In the inventive network (e.g. FIG. 7), the BGP capable routers in each regional network 90, typically the G-POP routers 73, 75 and the M-POP routers 63, 65 and 43, 45, form the BGP mini-AS system. The example illustrated in FIG. 7 shows four regional networks $90_1$, $90_2$, $90_3$ and $90_4$, wherein the BGP speakers form four mini-ASs, and the four mini-ASs together form a confederation with a single AS number 6517, for advertisement to independent autonomous systems.

The mini-autonomous systems could exchange confederation-BGP information with each other via a backbone network operated by the carrier. However, in accord with an aspect of the invention, the mini-autonomous systems exchange such BGP information with each other via the Internet 87 (FIG. 7).

The following list outlines the main features of the BGP provisioning in the exemplary network:

Single Autonomous System (AS) for the network BGP. As a result, the various regional networks appear to the rest of the Internet as one autonomous system with one AS number even though the regional networks communicate with each other via the Internet.

iBGP on G-POP core routers.

eBGP between G-POPs and M-POP switches and other peers.

Multi-hop eBGP for non-neighbor peers.

Advertisement of the private and public addresses in the carrier's iBGP Autonomous System (G-POPs).

Advertisement of the public IP addresses through eBGP to the M-POP switch.

Redistribution of the routes from OSPF into the BGP on the G-POPs.

Policy routing for the BGP including Community attribute for the private routes.

2 alternatives for private address redistribution:
   1) Direct WAN connectivity (via ATM or SDH over SONET) among the carrier's G-POP routers.
   2) GRE Tunnels and IBGP advertisements plus next-hop modification.

A more detailed discussion of certain inventive BGP operations follows.

OSPF runs as described in the preceding section only within the regional networks 90, whereas BGP provides routing information ultimately intended for communications going to and from the Internet 87. In the network of FIG. 7, BGP runs on the G-POP routers (GR) 73, 75 and preferably on the BlackDiamond switches, both in the M-POPs (MRs 43, 45, 63, 65) and the M/G-POPs (see. e.g. FIG. 2). OSPF runs on the E-POPs (Summit switches) and preferably on the BlackDiamond switches serving as the M-POP routers (MRs) at the heads of the access rings 30. In the presently preferred embodiment, the interaction between the two protocols occurs on the G-POP routers (GRs) and in the M-POP routers (MRs), which run both OSPF and BGP, that is to say OSPF for the internal routing and BGP for routing to/from the Internet.

With reference to FIG. 6, if an E-POP switch 33 has a packet to send to an Internet destination outside the autonomous region, the OSPF functionality causes the E-POP switch 33 to use a default route. The default route is defined by BGP signaling between the G-POP switches 73, 75 and the next hop router of the respective Internet service providers 77 and 79 (FIG. 3). The G-POP routers 73, 75 distribute the default routes via OSPF signaling through the backbone ring 50 and the access rings 30. The OSPF functionality causes the E-POP switch 33 to use one of the default routes, based on the best COST parameter associated therewith.

A BGP speaker that is a member of a confederation will use the confederation identifier (overall AS number) in all transactions with peers that are outside the confederation. In the example, the G-POP routers 73, 75 use the number 6517 for such external transactions, as the AS number, for example, in OPEN messages. The number 6517 is advertised as the AS_PATH attribute. For internal purposes, however, each mini-AS has a private mAS number assigned within the confederation. In the illustrated example, the BGP mini-AS of the regional network 90₁ has an mAS number of 65001, whereas the mAS formed by the BGP routers in the regional network $90_2$ has an mAS number of 65002. Similarly, the regional network $90_3$ uses an mAS number of 65003 for its group of BGP routers, and the mAS formed by the BGP routers in the regional network $90_4$ has an mAS number of 65004. Each router in a mini-AS uses its respective private mAS number as its routing domain identifier, in all transactions with peers that are members of the same confederation.

For BGP routing purposes, the network forming the nationwide autonomous system includes many different routers in different regions. Under the normal BGP standards, all routers in one autonomous system must be meshed together via internal links, that is to say there must be logical links between each of the routers for iBGP communications. All BGP routers in one BGP domain must be interconnected with each other.

In the nationwide or larger AS, with multiple backbone rings and BGP running on the M-POP routers 63, 65 and on the G-POP routers 73, 75, there are too many routers running BGP to mesh them all together. Instead of the normal BGP mesh arrangement, the inventive network utilizes a confederation, which comprises a mini-autonomous system (mAS) and one or more route reflectors (RR) in each regional network 90.

In each regional network 90, the G-POP routers (GR) and the various M-POP routers MR on the backbone ring, including those interconnected to the access rings, form a BGP mini-AS within the larger confederation. In the inventive network, each regional network includes one and preferably two route reflectors. Preferably, the G-POP routers (GRs) 73 and 75 serve as route reflectors for iBGP purposes. For simplicity of illustration and discussion here, it will be assumed that each mini-AS in a regional network 90 uses one G-POP router (GR) 75 as the route reflector (RR), for iBGP purposes.

The route reflector facilities iBGP operations within each regional network 90. Consider the regional network 90, as an example. For iBGP purposes, the various BGP speakers establish TCP sessions. Within the regional network $90_1$, this entails TCP sessions between the route reflector (RR) 75 and each of the other iBGP capable routers in the region, specifically the other G-POP router (GR) 73, the M-POP routers (MRs) 63, 65 and the M-POP routers 43, 45 (only one of which is shown for convenience). The drawing shows two examples of these TCP sessions as logical connections 91 between MRs and the route reflector RR, in dotted line form. The TCP sessions 91 form a logical mesh of connections, for iBGP communications, between the route reflector RR and the other BGP routers in the respective mini-AS. Although these links 91 may pass over multiple physical hops, logically, each TCP session looks like a single hop between peer routers in the BGP hierarchy of the network.

Via the various internal TCP sessions 91, the iBGP routers advertise routing information to the route reflector (RR) 75. The route reflector (RR) 75 redistributes this iBGP information, along with any BGP information it has received from other mini-ASs in the confederation or from external autonomous systems, to the other BGP routers within the regional network $90_1$.

The G-POP routers 73, 75 form the boundary for each respective regional network 90, and thus for BGP purposes, form the boundary gateway routers of the respective mini-AS. The G-POP routers 73, 75 serve as the boundary gateway routers, both for external BGP (eBGP) communications and for confederation communications with other mini-AS systems.

As noted, each BGP communication with a peer utilizes a TCP session for transport of the BGP control messages. Consider first a simple example of actual eBGP communications. For external communications with other autonomous systems on the public Internet, the G-POP routers 73, 75 connect to networks of one or more ISPs. In the simplified example of the regional network $90_1$, the G-POP routers 73, 75 connect via logical TCP sessions 93 to a peer router (R) 94 of an ISP. These TCP sessions 93 are peer connections carried as IP packets addressed between G-POP routers 73, 75 and the ISP router 94. Because of the IP addressing and the TCP session information, the ISP router 94 treats such packets as control information intended for or coming from its internal BGP agent.

The G-POP routers 73, 75 advertise BGP routing information for the regional network 90, to the ISP router 94, which redistributes that information through the Internet 87, for example, to the BGP router 96 in the independent autonomous system with an AS number 1234. The ISP router 94 also provides BGP route advertisements from such other autonomous systems to the gateway routers 73, 75.

As noted, the G-POP routers 73, 75 also serve as the boundary gateway routers for BGP communications to and from other mini-AS systems within the confederation. The routers 73, 75 in the various mini-ASs could be meshed, however, it is preferred to connect these boundary routers to a hub. In the confederation, one or more of the BGP capable routers is designated as a hub. In a preferred embodiment, the G-POP routers 73 and 75 in two of the regions 90 serve as the hub BGP routers. In the simplified example shown in the drawing, however, one G-POP router 73a in the region $90_3$ serves as the hub for the illustrated confederation.

Again, the BGP communications utilize TCP to transport peer communications for BGP control purposes. In this case, the TCP sessions 95 are IP addressed communications through the public Internet 87. These TCP sessions 95 transport two-way BGP-confederation communications between the hub G-POP router 73a in the region $90_3$ and the G-POP routers 73, 75 in other regions $90_1, 90_2, 90_4$. Because of the IP addressing and the TCP session information, routers in the public Internet 87 including for example the IP router 94, simply see these communications as packet transmissions between the respective routers 73, 75, 73a. The TCP sessions 95, however, represent peer communications for control purposes, and allow the routers to send and receive the BGP-confederation commands.

In practice, the G-POP routers 73, 75 in the regions $90_1$, $90_2$, $90_4$ advertise BGP confederation routing information to the hub router 73a, and the hub router redistributes that information among the G-POP routers 73, 75 in the regions $90_1$, $90_2$, $90_4$. In this fashion, the hub BGP router 73a synchronizes the BGP for all of the mini-ASs. The information exchanged in this manner relates to BGP routing within the confederation in a manner analogous to iBGP routing within one autonomous system, or in the inventive network within one mini-AS.

The use of confederation-based BGP between the mini-ASs allows implementation of route dampening, in a manner similar to that normally provided for eBGP routing information. Essentially, if received route information indicates that a route is "flapping" (repeatedly going up and down in a short period of time), the routers receiving this information will suppress the routing information relating to that route by deleting the route from their respective BGP routing tables. The route is restored only when it meets some predefined criteria indicating that the route has become stable.

Mixed Internet and MAN Service

We have extensively discussed Internet and MAN services and adaptations of the routing and switching protocols to support those services. The network also supports a VPN-based mixed Internet and LAN-Extension Service. The Multi-protocol Inter-Regional LAN-Extension uses routers configured to route required routable protocols (IP, IPX, Appletalk, Decnet). These routers also are configured for GRE tunnels in between the sites to tunnel multi-protocol over IP. To support non-routable protocols, namely SNA and Netbios, Data Link Switching Plus (DLSW+) will be configured to encapsulate them on IP. In any case, the output of the routers will be pure IP traffic with source and destination public IP addresses, which will be routed via the OSPF and BGP on the backbone ring 50.

The VPN-Based Mixed Internet and LAN-Extension service will support IP-only customers and has similar hardware arrangement as the IP-only Inter-Regional LAN-Extension service. A VPN device is used in the customer premises to tunnel LAN-Extension traffic over the network. The VPN device will be configured to pass through the Internet traffic without encapsulation. On the traffic engineering side, however, there is no criteria for bandwidth split between the two types of services. Therefore, it is necessary to over-provision the trunks on both LAN-Extension and Internet services to guarantee certain QoS for this mixed service.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. An extended-area network, for data communications, comprising:
   a backbone network comprising:
   (a) a plurality of backbone data switches;
   (b) a first ring of optical fiber interconnecting the backbone data switches; and
   (c) at least one core data switch coupled to the first ring of optical fiber, for providing data communication to and from a wide area data network; and
   a plurality of access networks, each access network comprising:
   (1) a plurality of edge data switches;
   (2) a second ring of optical fiber interconnecting the edge data switches and at least one of the backbone data switches; and
   (3) one or more data links extending from each of the edge data switches, for coupling to end-user data equipment;
   a plurality of learning bridge modules, one of the learning bridge modules running in each of the edge data switches of a respective one of the access networks, for learning media access control addresses and port information corresponding to the media access control addresses for switching control purposes from frames communicated via the respective access network;
   a spanning tree protocol agent, running in the at least one backbone data switch interconnected to the second ring of optical fiber of the respective access network, for managing routing tables for the media access control addresses, wherein the edge data switches of the respective one of the access networks do not run spanning tree protocol; and
   an aging timer with a predetermined value, included in each of the learning bridge modules, for causing a respective edge data switch to discard learned port information corresponding to an individual media access control address if no further frame containing the individual media access control address is received before the aging timer reaches the predetermined value, wherein the predetermined value is set to a relatively short time period in each of the edge data switches of the respective access network.

2. An extended-area network as in claim 1, wherein the predetermined value of the aging timer is approximately thirty seconds or less.

3. An extended-area network as in claim 1, wherein the edge data switches and the backbone data switches are configured to utilize layer 1 and layer 2 elements of a local area networking protocol for transport of end user communications over the data links and over the first and second rings of optical fiber.

4. An extended-area network as in claim 1, wherein:
the edge data switches are configured to limit rates of upstream transmissions accepted from each respective one of the one or more data links extending therefrom in accord with a service level agreement with a respective customer; and
at least the backbone data switches are configured to limit downstream communications through the backbone network and the access networks.

5. A regional-area network, for data communications, comprising:
a plurality of access ring networks, each access ring network comprising:
(a) a plurality of edge-point of presence (E-POP) switches;
(b) data links extending from the E-POP switches to individual customer locations;
(c) at least one mega-point of presence (M-POP) switch; and
(d) a redundant optical fiber access ring interconnecting the E-POP switches and the at least one M-POP switch;
a redundant optical fiber backbone ring interconnecting the M-POP switches of the access ring networks;
at least one giga-point of presence (G-POP) switch coupled to the redundant optical fiber backbone ring, for providing data communication to and from a wide area data network;
a learning bridge module, running in each of the E-POP switches of a respective one of the access ring networks, for learning media access control addresses and port information corresponding to the media access control addresses for switching control purposes from frames communicated via the respective access ring network;
a spanning tree protocol agent, running in the at least one M-POP switch of the respective access ring network, for managing forwarding so as to avoid loops, wherein the E-POP switches of the respective one of the access ring networks do not run spanning tree protocol; and
an aging timer with an assigned value, included in each of the learning bridge modules, for causing a respective E-POP switch to discard learned port information corresponding to an individual media access control address if no further frame containing the individual media access control address is received before the aging timer reaches the assigned value,
wherein the assigned value is set to a relatively short time period in each of the E-POP switches of the respective access ring network, so that the learning bridge modules learn relatively quickly, to compensate for lack of interaction between the spanning tree protocol agent running in the at least one M-POP switch of the respective access ring network and the learning bridge modules running in the E-POP switches of the respective one of the access ring networks.

6. A regional-area network as in claim 5, wherein the assigned value is approximately thirty seconds or less.

7. A regional-area network as in claim 5, wherein the E-POP switches and the M-POP switches are configured to utilize elements of a local area networking protocol as layer 1 and layer 2 protocols for transport of end user communications over the data links and over the redundant optical fiber rings.

8. A regional-area network as in claim 5, wherein:
the E-POP switches are configured to limit rates of upstream transmissions accepted from and downstream transmissions to each respective one of the one or more data links extending therefrom in accord with a service level agreement with a respective end-use customer; and
at least the M-POP switches are configured to limit downstream communications through the redundant optical fiber rings for each service.

9. A network for data communications, comprising:
a plurality of access ring networks, each respective access ring network comprising:
(a) a plurality of edge-point of presence (E-POP) switches;
(b) data links from the E-POP switches to individual customer locations;
(c) at least one mega-point of presence (M-POP) switch;
(d) an access ring of links interconnecting the E-POP switches and the at least one M-POP switch, for carrying data communications therebetween;
(e) a learning bridge module, running in each of the E-POP switches of the respective access ring network, for learning media access control addresses and port information corresponding to the media access control addresses for switching control purposes from frames communicated via the respective access ring network;
(f) a spanning tree protocol agent, running in the at least one M-POP switch of the respective access ring network, for managing forwarding tables for media access control addresses, wherein the E-POP switches of the respective access ring network do not run spanning tree protocol; and
(g) an aging timer with a reduced set value, for each of the learning bridge modules, for causing a respective E-POP switch to discard learned port information corresponding to an individual media access control address if no further frame containing the individual media access control address is received before the aging timer reaches the set value, wherein the set value is a relatively short time period in each of the E-POP switches of the respective access ring network; and
a backbone ring interconnecting the M-POP switches of the respective access ring networks.

10. A network as in claim 9, wherein the value is set to approximately thirty seconds or less.

11. A network as in claim 9, wherein the network utilizes logical circuit switching, based on the learned media access control addresses and port information corresponding to the media access control addresses in the E-POP switches and based on the forwarding tables for media access control addresses in the at least one M-POP switch of the respective access ring network, to provide at least one local area network extension service.

12. A network as in claim 9, wherein the links of each access ring comprise optical fibers.

13. A network as in claim 12, wherein the backbone ring comprises a ring of optical fibers interconnecting the M-POP switches of the access ring networks.

14. A network as in claim 9, further comprising at least one giga-point of presence (G-POP) switch coupled to the backbone ring, for providing data communication to and from a wide area data network.

15. A network as in claim 9, wherein:

the at least one M-POP switch of each respective access ring network comprises a pair of interconnected data switches each coupled to the access ring of links in the respective access ring network, and each data switch of an interconnected pair runs a spanning tree protocol agent.

* * * * *